(12) United States Patent
Zhang et al.

(10) Patent No.: US 9,195,491 B2
(45) Date of Patent: Nov. 24, 2015

(54) MIGRATING MIDDLEBOX STATE FOR DISTRIBUTED MIDDLEBOXES

(71) Applicant: Nicira, Inc., Palo Alto, CA (US)

(72) Inventors: Ronghua Zhang, San Jose, CA (US); Teemu Koponen, San Francisco, CA (US); Pankaj Thakkar, Santa Clara, CA (US); Amar Padmanabhan, Menlo Park, CA (US); W. Andrew Lambeth, San Mateo, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 390 days.

(21) Appl. No.: 13/678,520

(22) Filed: Nov. 15, 2012

(65) Prior Publication Data

US 2013/0125120 A1   May 16, 2013

Related U.S. Application Data

(60) Provisional application No. 61/560,279, filed on Nov. 15, 2011.

(51) Int. Cl.
*G06F 9/455* (2006.01)
*H04L 12/751* (2013.01)
(Continued)

(52) U.S. Cl.
CPC ............ *G06F 9/45558* (2013.01); *G06F 9/455* (2013.01); *G06F 9/45533* (2013.01); *G06F 15/177* (2013.01); *H04L 12/2424* (2013.01); *H04L 41/0803* (2013.01); *H04L 41/0806* (2013.01); *H04L 41/0813* (2013.01); *H04L 41/0823* (2013.01); *H04L 41/0889* (2013.01); *H04L 41/0893* (2013.01); *H04L 45/74* (2013.01); *H04L 49/70* (2013.01); *H04L 61/2503* (2013.01); *H04L 61/256* (2013.01); *H04L 61/2517* (2013.01); *H04L 61/2521* (2013.01); *H04L 63/0218* (2013.01); *H04L 67/1008* (2013.01); *G06F 2009/4557* (2013.01); *H04L 41/12* (2013.01); *H04L 45/02* (2013.01); *H04L 49/15* (2013.01)

(58) Field of Classification Search
None
See application file for complete search history.

(56) References Cited

U.S. PATENT DOCUMENTS

| 5,504,921 | A | 4/1996 | Dev et al. |
| 5,550,816 | A | 8/1996 | Hardwick et al. |

(Continued)

FOREIGN PATENT DOCUMENTS

| AU | 2012340383 | 4/2014 |
| AU | 2012340387 | 4/2014 |

(Continued)

OTHER PUBLICATIONS

WO 2013/074847 with International Search Report, May 23, 2013, Nicira, Inc.

(Continued)

*Primary Examiner* — Qing Wu
(74) *Attorney, Agent, or Firm* — Adeli LLP

(57) ABSTRACT

A controller of a network control system for configuring several middlebox instances is described. The middlebox instances implement a middlebox in a distributed manner in several hosts. The controller configures, in a first host, a first middlebox instance to receive a notification from a migration module before a virtual machine (VM) running in the first host migrates to a second host and to send middlebox state related to the VM to the migration module.

18 Claims, 10 Drawing Sheets

(51) Int. Cl.
*H04L 12/24* (2006.01)
*H04L 12/933* (2013.01)
*H04L 29/06* (2006.01)
*H04L 12/741* (2013.01)
*G06F 15/177* (2006.01)
*H04L 29/12* (2006.01)
*H04L 12/931* (2013.01)
*H04L 29/08* (2006.01)

(56) References Cited

U.S. PATENT DOCUMENTS

| | | | |
|---|---|---|---|
| 5,751,967 A | 5/1998 | Raab et al. | |
| 6,104,699 A | 8/2000 | Holender et al. | |
| 6,353,614 B1 | 3/2002 | Borella et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,880,089 B1 | 4/2005 | Bommareddy et al. | |
| 7,046,630 B2 | 5/2006 | Abe et al. | |
| 7,055,173 B1 | 5/2006 | Chaganty et al. | |
| 7,197,572 B2 | 3/2007 | Matters et al. | |
| 7,209,439 B2 | 4/2007 | Rawlins et al. | |
| 7,283,473 B2 | 10/2007 | Arndt et al. | |
| 7,342,916 B2 | 3/2008 | Das et al. | |
| 7,450,598 B2 | 11/2008 | Chen et al. | |
| 7,478,173 B1 | 1/2009 | Delco | |
| 7,512,744 B2 | 3/2009 | Banga et al. | |
| 7,555,002 B2 | 6/2009 | Arndt et al. | |
| 7,606,260 B2 | 10/2009 | Oguchi et al. | |
| 7,627,692 B2 | 12/2009 | Pessi | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,730,486 B2 | 6/2010 | Herington | |
| 7,764,599 B2 | 7/2010 | Doi et al. | |
| 7,792,987 B1 | 9/2010 | Vohra et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,856,549 B2 | 12/2010 | Wheeler | |
| 7,885,276 B1 | 2/2011 | Lin | |
| 7,925,850 B1 | 4/2011 | Waldspurger et al. | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,166,201 B2 | 4/2012 | Richardson et al. | |
| 8,199,750 B1 | 6/2012 | Schultz et al. | |
| 8,204,982 B2 | 6/2012 | Casado et al. | |
| 8,224,931 B1 | 7/2012 | Brandwine et al. | |
| 8,224,971 B1 | 7/2012 | Miller et al. | |
| 8,265,075 B2 | 9/2012 | Pandey | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,456,984 B2 | 6/2013 | Ranganathan et al. | |
| 8,463,904 B2 | 6/2013 | Casado et al. | |
| 8,468,548 B2 | 6/2013 | Kulkarni et al. | |
| 8,473,557 B2 | 6/2013 | Ramakrishnan et al. | |
| 8,571,031 B2 | 10/2013 | Davies et al. | |
| 8,611,351 B2 | 12/2013 | Gooch et al. | |
| 8,612,627 B1 | 12/2013 | Brandwine et al. | |
| 8,621,058 B2 | 12/2013 | Eswaran et al. | |
| 8,625,594 B2 | 1/2014 | Safrai et al. | |
| 8,644,188 B1 | 2/2014 | Brandwine et al. | |
| 8,650,618 B2 | 2/2014 | Asati et al. | |
| 8,743,885 B2 | 6/2014 | Khan et al. | |
| 8,762,501 B2 | 6/2014 | Kempf et al. | |
| 8,819,678 B2 | 8/2014 | Tsirkin | |
| 8,913,611 B2 | 12/2014 | Koponen et al. | |
| 8,966,024 B2 | 2/2015 | Koponen et al. | |
| 8,966,029 B2 | 2/2015 | Zhang et al. | |
| 2002/0093952 A1 | 7/2002 | Gonda | |
| 2002/0161867 A1 | 10/2002 | Cochran et al. | |
| 2002/0194369 A1 | 12/2002 | Rawlins et al. | |
| 2003/0069972 A1 | 4/2003 | Yoshimura et al. | |
| 2003/0093481 A1 | 5/2003 | Mitchell et al. | |
| 2004/0049701 A1 | 3/2004 | Le Pennec et al. | |
| 2004/0054793 A1 | 3/2004 | Coleman | |
| 2004/0098505 A1 | 5/2004 | Clemmensen | |
| 2005/0018669 A1 | 1/2005 | Arndt et al. | |
| 2005/0021683 A1 | 1/2005 | Newton et al. | |
| 2005/0050377 A1 | 3/2005 | Chan et al. | |
| 2005/0083953 A1 | 4/2005 | May | |
| 2005/0132030 A1 | 6/2005 | Hopen et al. | |
| 2005/0249199 A1 | 11/2005 | Albert et al. | |
| 2006/0092976 A1 | 5/2006 | Lakshman et al. | |
| 2006/0221961 A1 | 10/2006 | Basso et al. | |
| 2007/0140128 A1 | 6/2007 | Klinker et al. | |
| 2007/0233838 A1 | 10/2007 | Takamoto et al. | |
| 2007/0266433 A1 | 11/2007 | Moore | |
| 2007/0283348 A1 | 12/2007 | White | |
| 2007/0286185 A1 | 12/2007 | Eriksson et al. | |
| 2008/0002579 A1 | 1/2008 | Lindholm et al. | |
| 2008/0005293 A1 | 1/2008 | Bhargava et al. | |
| 2008/0049621 A1 | 2/2008 | McGuire et al. | |
| 2008/0071900 A1 | 3/2008 | Hecker et al. | |
| 2008/0072305 A1 | 3/2008 | Casado et al. | |
| 2008/0163207 A1 | 7/2008 | Reumann et al. | |
| 2008/0186990 A1 | 8/2008 | Abali et al. | |
| 2008/0189769 A1 | 8/2008 | Casado et al. | |
| 2008/0196100 A1 | 8/2008 | Madhavan et al. | |
| 2008/0205377 A1 | 8/2008 | Chao et al. | |
| 2008/0225853 A1 | 9/2008 | Melman et al. | |
| 2008/0240122 A1 | 10/2008 | Richardson et al. | |
| 2009/0031041 A1 | 1/2009 | Clemmensen | |
| 2009/0063750 A1 | 3/2009 | Dow | |
| 2009/0083445 A1 | 3/2009 | Ganga | |
| 2009/0092137 A1 | 4/2009 | Haigh et al. | |
| 2009/0122710 A1 | 5/2009 | Bar-Tor et al. | |
| 2009/0129271 A1 | 5/2009 | Ramankutty et al. | |
| 2009/0150527 A1 | 6/2009 | Tripathi et al. | |
| 2009/0161547 A1 | 6/2009 | Riddle et al. | |
| 2009/0199177 A1 | 8/2009 | Edwards et al. | |
| 2009/0240924 A1 | 9/2009 | Yasaki et al. | |
| 2009/0249470 A1 | 10/2009 | Litvin et al. | |
| 2009/0249473 A1 | 10/2009 | Cohn | |
| 2009/0292858 A1 | 11/2009 | Lambeth et al. | |
| 2009/0300210 A1 | 12/2009 | Ferris | |
| 2009/0303880 A1 | 12/2009 | Maltz et al. | |
| 2009/0327781 A1 | 12/2009 | Tripathi | |
| 2010/0046530 A1 | 2/2010 | Hautakorpi et al. | |
| 2010/0046531 A1 | 2/2010 | Louati et al. | |
| 2010/0115080 A1* | 5/2010 | Kageyama | 709/223 |
| 2010/0115101 A1 | 5/2010 | Lain et al. | |
| 2010/0125667 A1 | 5/2010 | Soundararajan | |
| 2010/0131636 A1 | 5/2010 | Suri et al. | |
| 2010/0138830 A1 | 6/2010 | Astete et al. | |
| 2010/0153554 A1 | 6/2010 | Anschutz et al. | |
| 2010/0165876 A1* | 7/2010 | Shukla et al. | 370/254 |
| 2010/0165877 A1 | 7/2010 | Shukla et al. | |
| 2010/0214949 A1 | 8/2010 | Smith et al. | |
| 2010/0254385 A1 | 10/2010 | Sharma et al. | |
| 2010/0257263 A1 | 10/2010 | Casado et al. | |
| 2010/0287548 A1 | 11/2010 | Zhou et al. | |
| 2010/0322255 A1 | 12/2010 | Hao et al. | |
| 2011/0022695 A1 | 1/2011 | Dalal et al. | |
| 2011/0075674 A1 | 3/2011 | Li et al. | |
| 2011/0085559 A1 | 4/2011 | Chung et al. | |
| 2011/0225594 A1 | 9/2011 | Iyengar et al. | |
| 2011/0261825 A1 | 10/2011 | Ichino | |

(56) References Cited

U.S. PATENT DOCUMENTS

| | | |
|---|---|---|
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0144014 A1 | 6/2012 | Natham et al. |
| 2012/0155266 A1 | 6/2012 | Patel et al. |
| 2012/0236734 A1 | 9/2012 | Sampath et al. |
| 2012/0246637 A1 | 9/2012 | Kreeger et al. |
| 2012/0281540 A1 | 11/2012 | Khan et al. |
| 2013/0073743 A1 | 3/2013 | Ramasamy et al. |
| 2013/0074181 A1 | 3/2013 | Singh |
| 2013/0121209 A1 | 5/2013 | Padmanabhan et al. |
| 2013/0125230 A1 | 5/2013 | Koponen et al. |
| 2013/0128891 A1 | 5/2013 | Koponen et al. |
| 2013/0132531 A1 | 5/2013 | Koponen et al. |
| 2013/0132532 A1 | 5/2013 | Zhang et al. |
| 2013/0132533 A1 | 5/2013 | Padmanabhan et al. |
| 2013/0132536 A1 | 5/2013 | Zhang et al. |
| 2013/0163427 A1 | 6/2013 | Beliveau et al. |
| 2013/0163475 A1 | 6/2013 | Beliveau et al. |
| 2013/0163594 A1 | 6/2013 | Sharma et al. |
| 2013/0227097 A1 | 8/2013 | Yasuda et al. |
| 2014/0016501 A1 | 1/2014 | Kamath et al. |
| 2014/0169375 A1 | 6/2014 | Khan et al. |
| 2014/0195666 A1 | 7/2014 | Dumitriu et al. |
| 2015/0081861 A1 | 3/2015 | Koponen et al. |

FOREIGN PATENT DOCUMENTS

| | | |
|---|---|---|
| EP | 1653688 | 5/2006 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| JP | 2003-124976 | 4/2003 |
| JP | 2003-318949 | 11/2003 |
| WO | WO 99/18534 | 4/1999 |
| WO | WO 2005/112390 | 11/2005 |
| WO | WO 2008/095010 | 8/2008 |
| WO | WO 2012/051884 | 4/2012 |

OTHER PUBLICATIONS

WO 2013/074831 with International Search Report, May 23, 2013, Nicira, Inc.

WO 2013/074855 with International Search Report, May 23, 2013, Nicira, Inc.

WO 2013/074827 with International Search Report, May 23, 2013, Nicira, Inc.

WO 2013/074844 with International Search Report, May 23, 2013, Nicira, Inc.

WO 2013/074828 with International Search Report, May 23, 2013, Nicira, Inc.

WO 2013/074842 with International Search Report, May 23, 2013, Nicira, Inc.

Andersen, David, et al., "Resilient Overlay Networks," Oct. 2001, 15 pages, 18th ACM Symp. on Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.

Author Unknown , "Cisco VN-Link: Virtualization-Aware Networking," Month Unknown, 2009, 10 pages, Cisco Systems, Inc.

Author Unknown, "Cisco VN-Link: Virtual Machine-Aware Networking," Apr. 2009, 2 pages, Cisco Systems, Inc.

Author Unknown, "Intel 82599 10 Gigabit Ethernet Controller: Datasheet, Revision: 2.73," Dec. 2011, 930 pages, Intel Corporation.

Author Unknown, "Virtual Machine Device Queues," White Paper, Month Unknown, 2007, pp. 1-4, Intel Corporation.

Author Unknown , "VMare for Linux Networking Support," Date Unknown but prior to Nov. 17, 1999, pp. 1-5, VMWare, Inc.

Barham, Paul, et al., "Xen and the Art of Virtualization," Oct. 19-22, 2003, pp. 1-14, SOSP'03, Bolton Landing New York, USA.

Cai, Zheng, et al., "The Preliminary Design and Implementation of the Maestro Network Control Platform," Oct. 1, 2008, pp. 1-17, NSF.

Casado, Martin, et al. "Ethane: Taking Control of the Enterprise," SIGCOMM'07, Aug. 27-31, 2007, pp. 1-12, ACM, Kyoto, Japan.

Casado, Martin, et al., "Rethinking Packet Forwarding Hardware," Seventh ACM SIGCOMM' HotNets Workshop, Nov. 2008, pp. 1-6, ACM.

Casado, Martin, et al., "SANE: A Protection Architecture for Enterprise Networks," In proceedings of Usenix Security, Aug. 2006, pp. 1-15.

Casado, Martin, et al., "Scaling Out: Network Virtualization Revisited," Month Unknown, 2010, pp. 1-8.

Casado, Martin, et al., "Virtualizing the Network Forwarding Plane," Dec. 2010, pp. 1-6.

Congdon, Paul, "Virtual Ethernet Port Aggregator Standards body Discussion," Nov. 10, 2008, pp. 1-26, HP.

Davoli, Renzo, "VDE: Virtual Distributed Ethernet," TRIDENTCOM'05, Feb. 23-25, 2005, pp. 1-8, IEEE Computer Society.

Dixon, Colin, et al., "An End to the Middle," Proceedings of the 12th conference on Hot topics in operating systems USENIX Association, May, 2009, pp. 1-5, Berkeley, CA, USA.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.

Farrel, A., "A Path Computation Element (PCS)—Based Architecture," Aug. 2006, pp. 1-41, RFC 4655.

Fischer, Anna, "[PATCH][RFC] net/bridge: add basic VEPA support," Jun. 2009, pp. 1- 5, GMANE Org.

Garfinkel, Tal, et al., "A Virtual Machine Introspection Based Architecture for Intrusion Detection," In Proc. Network and Distributed Systems Security Symposium, Feb. 2003, pp. 1-16.

Greenberg, Albert, et al., "A Clean Slate 4D Approach to Network Control and Management," ACM SIGCOMM Computer Communication Review, Oct. 2005, 12 pages, vol. 35, No. 5.

Greenberg, Albert, et al., "VL2: A Scalable and Flexible Data Center Network," SIGCOMM'09, Aug. 17-21, 2009, pp. 51-62, ACM, Barcelona, Spain.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX: Towards an Operating System for Networks," ACM SIGCOMM Computer communication Review, Jul. 2008, pp. 105-110, vol. 38, No. 3.

Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.

Hinrichs, Timothy L., et al., "Practical Declarative Network Management," WREN'09, Aug. 21, 2009, pp. 1-10, Barcelona, Spain.

Ioannidis, Sotiris, et al., "Implementing a Distributed Firewall," CCS'00, Month Unknown, 2000, pp. 1-10, ACM, Athens, Greece.

Joseph, Dilip, et al., "A Policy-aware Switching Layer for Date Centers," Jun. 24, 2008, 26 pages, Electrical Engineering and Computer Sciences, University of California, Berkeley, CA, USA.

Kamath, Daya, et. al., "Edge virtual Bridge Proposal, Version 0. Rev. 0.1," Apr. 23, 2010, pp. 1-72, IEEE.

Keller, Eric, et al., "The 'Platform as a Service' Model for Networking," Month Unknown, 2010, pp. 1-6.

Koponen, Teemu, et al., "Onix: A Distributed Control Platform for Large-scale Production Networks," In Proc. OSDI, Oct. 2010, pp. 1-14.

Lakshminarayanan, Karthik, et al., "Routing as a Service," Month Unknown, 2004, pp. 1-15, Berkeley, California.

(56) References Cited

OTHER PUBLICATIONS

Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," In USENIX OSDI, Month Unknown, 2010, pp. 1-14.
Yang, L., et al., "Forwarding and Control Element Separation (ForCES) Framework," Apr. 2004, pp. 1-40, The Internet Society.
Portions of prosecution history of U.S. Appl. No. 13/678,498, Jun. 25, 2014, Nicira, Inc.
Portions of prosecution history of U.S. Appl. No. 13/678,485, Jun. 26, 2014, Nicira, Inc.
Portions of prosecution history of U.S. Appl. No. 13/678,518, Aug. 18, 2014, Nicira, Inc.
Portions of prosecution history of U.S. Appl. No. 13/678,504, Jul. 9, 2014, Nicira, Inc.
Portions of prosecution history of U.S. Appl. No. 13/678,512, Jul. 23, 2014, Nicira, Inc.
International Preliminary Report on Patentability for PCT/US2012/065359, May 30, 2014, Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr., 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
U.S. Appl. No. 14/549,512, filed Nov. 20, 2014, Koponen, Teemu, et al.
U.S. Appl. No. 14/595,195, filed Jan. 12, 2015, Zhang, Ronghua, et al.
U.S. Appl. No. 14/595,199, filed Jan. 12, 2015, Koponen, Teemu, et al.
Updated portions of prosecution history of U.S. Appl. No. 13/678,518, Sep. 2, 2014, Koponen, Teemu, et al.
Updated portions of prosecution history of U.S. Appl. No. 13/678,504, Dec. 19, 2014, Koponen, Teemu, et al.
Updated portions of prosecution history of U.S. Appl. No. 13/678,512, Mar. 10, 2015, Padmanabhan, Amar, et al.
Updated portions of prosecution history of U.S. Appl. No. 13/678,498, Jan. 23, 2015, Koponen, Teemu, et al.
Portions of prosecution history of U.S. Appl. No. 13/678,536, Mar. 18, 2015, Padmanabhan, Amar, et al.
Updated portions of prosecution history of U.S. Appl. No. 13/678,485, Jan. 23, 2015, Zhang, Ronghua, et al.
Portions of prosecution history of EP12849710.4, Jan. 12, 2015, Nicira, Inc.
Portions of prosecution history of EP12849295.6, Mar. 24, 2015, Nicira, Inc.
Portions of prosecution history of EP12849104.0, Jan. 30, 2015, Nicira, Inc.
Portions of prosecution history of AU2012340383, Mar. 19, 2015, Nicira, Inc.
Portions of prosecution history of EP12850519.5, Jan. 12, 2015, Nicira, Inc.
Portions of prosecution history of AU2012340387, Mar. 17, 2015, Nicira, Inc.
Portions of prosecution history of EP12849015.8, Jan. 29, 2015, Nicira, Inc.
Portions of prosecution history of EP12850665.6, Oct. 9, 2014, Nicira, Inc.
Author Unknown, "Enabling Service Chaining on Cisco Nexus 1000V Series," Month Unknown, 2012, 25 pages, CISCO.
Dumitriu, Dan Mihai, et al. U.S. Appl. No. 61/514,990, filed Aug. 4, 2011.
Kent, S., "IP Encapsulating Security Payload (ESP)," Dec. 2005, pp. 1-44, The Internet Society.
Mann, Vijay, et al., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
Stiemerling, M., et al., "Middlebox Communication (MIDCOM) Protocol Semandtics," Mar. 2008, 70 pages, Internet Engineering Task Force.

\* cited by examiner

MIGRATING MIDDLEBOX STATE FOR DISTRIBUTED MIDDLEBOXES

CLAIM OF BENEFIT TO PRIOR APPLICATION

This application claims the benefit of U.S. Provisional Application 61/560,279, entitled "Virtual Middlebox Services", filed Nov. 15, 2011.U.S. Application 61/560,279 is incorporated herein by reference.

BACKGROUND

Many current enterprises have large and sophisticated networks comprising switches, hubs, routers, middleboxes, servers, workstations and other networked devices, which support a variety of connections, applications and systems. The increased sophistication of computer networking, including virtual machine migration, dynamic workloads, multi-tenancy, and customer-specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: for example, forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals result in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows a user to specify a logical network that includes one or more logical forwarding elements (e.g., logical switches, logical routers, etc.) and one or more middleboxes (e.g., firewalls, load balancers, network address translators, intrusion detection systems (IDS), wide area network (WAN) optimizers, etc.). The system implements the user-specified logical forwarding elements across numerous managed switching elements on numerous physical machines that also host virtual machines of the logical network. The system implements the user-specified middleboxes across the numerous physical machines. Typically, the system of some embodiments configures, in one host machine, a managed switching element that implements at least part of the logical switching elements, a distributed middlebox instance that provides a middlebox service to the packets forwarded by the managed switching element, and one or more virtual machines (VMs).

When a VM migrates from a source host to a destination host, the distributed middlebox instance of some embodiments, running in the source host, sends the state information related to the VM to the distributed middlebox instance running in the destination host. Using the states, the distributed middlebox instance running in the destination host resumes the middlebox service to the particular VM.

A distributed middlebox instance of different embodiments sends the state information related to the migrating VM to the distributed middlebox instance running in the destination host differently. For instance, in some embodiments, the distributed middlebox instance running in the source host uses a pre-notification sent by a VM migration manager before the VM is migrated. In response to receiving the pre-notification, the distributed middlebox instance running in the source host gathers all middlebox state that is related to the migrating VM and sends the gathered state to the VM migration manager.

The VM continues to operate in the source host and the distributed middlebox instance running in the source host supplies the state updates to the VM migration manager. As the VM migration manager stuns the VM at the source host and migrates the VM to the destination host, the VM migration manager also migrates the middlebox state related to the VM to the destination host. The VM migration manager running in the destination host then provisions the VM at the destination host and sends the middlebox state to the distributed middlebox instance running in the destination host. The distributed middlebox instance running in the destination host resumes the middlebox service to the migrated VM.

In some embodiments, the VM migration manager does not support pre-notification messages. In these embodiments, the distributed middlebox instance running at the source host still uses the VM migration manager to send the middlebox state related to the VM to the destination host. However, the middlebox state migration starts after the VM migrates to the destination host.

In some embodiments, the network control system configures the distributed middlebox instances to interact with the VM migration managers to migrate the middlebox state for migrating VMs. In some embodiments, the network control system configures the distributed middlebox by sending the middlebox configuration data to the distributed middlebox instances. The network control system configures the distributed middlebox in a similar way to how the network control system configures the managed switching elements to perform logical forwarding processing of the logical switching elements of a user.

In some embodiments, the network control system has several controllers including logical controllers and physical controllers. A logical controller is a master of logical switching elements of a user. A logical controller of some embodiments receives specification of the logical switching elements from the user, in the form of logical control plane (LCP) data. The logical controller translates the LCP data into logical forwarding plane (LFP) data, which define the control plane and the forwarding plane of the logical switching elements. The logical controller then translates the LFP data to universal physical control plane (UPCP) data. The logical controller then identifies a set of physical controllers, each of which is responsible for managing a managed switching element. The logical controller sends the UPCP data only to the identified set of physical controllers that manage managed switching elements each of which at least partially implements the logical switching elements of the user.

A physical controller translates the UPCP data into customized physical control plane (CPCP) data, which is control plane data for the managed switching elements that implement the logical switching elements. A physical controller sends the CPCP data to the managed switching element. The managed switching elements then translate the customized control plane to perform the logical forwarding processing of the logical switching elements specified by the user.

Similarly, a logical controller receives configuration data for configuring the middlebox. The logical controller identifies the same set of physical controllers which are masters of the managed switching elements that implement, at least partially, the logical switching elements specified by the user. The logical controller sends the middlebox configuration data to the identified set of physical controllers. The physical controller of some embodiments then sends the middlebox configuration data to the managed switching elements so that the managed switching elements can send the middlebox configuration data to the distributed middlebox instances. Alternatively, the physical controller sends the middlebox configuration data directly to the distributed middlebox instance, which is hosted in the same physical machine as the managed switching elements of which the physical controller is the master.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a middlebox that is implemented in a distributed manner, a distributed middlebox instance of some embodiments that implements the middlebox may provide middlebox service to one or more virtual machines (VM) that are running in the same host as the distributed middlebox instance. When a particular VM migrates from a first host to a second host, the distributed middlebox instance of some embodiments sends the state related to the particular VM to the distributed middlebox instance running in the second host. Using the state, the distributed middlebox instance running in the second host resumes the middlebox service to the particular VM.

Several examples of such distributed middlebox instances are described below in Section I. Section II then describes a network control system. Section III describes an electronic system that implements some embodiments of the invention.

I. Migrating Middlebox State

A. Distributed Middleboxes

Figure 1:
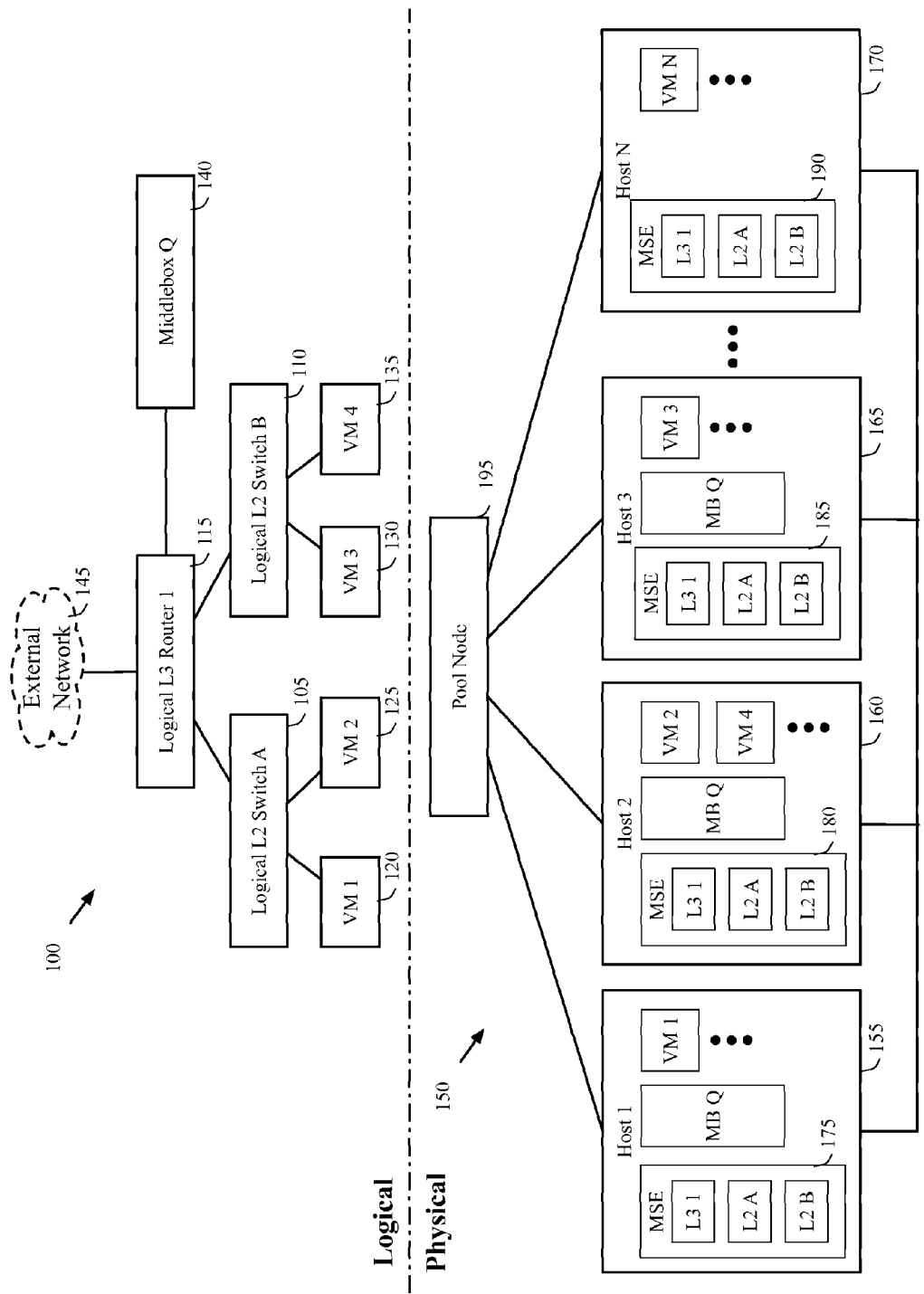
FIG. 1 conceptually illustrates a logical network topology of some embodiments that is implemented in a managed network in a distributed fashion.

FIG. 1 conceptually illustrates a logical network topology 100 of some embodiments that is implemented in a managed network in a distributed fashion. Shown in the top half of the figure, network topology 100 is a simplified network for purposes of explanation. The network includes two logical L2 switches 105 and 110 connected by a logical L3 router 115. The logical switch 105 connects virtual machines 120 and 125, while the logical switch 110 connects virtual machines 130 and 135. The logical router 115 also connects to an external network 145.

In addition, a middlebox 140 attaches to the logical router 115. One of ordinary skill in the art will recognize that the network topology 100 represents just one particular logical network topology into which a middlebox may be incorporated. In various embodiments, the middlebox may be located directly between two other components (e.g., directly between the gateway and logical router in order to monitor and process all traffic entering or exiting the logical network), or in other locations in a more complex network.

In the architecture shown in FIG. 1, the middlebox 140 is not located within the direct traffic flow, either from one domain to the other, or between the external world and the domain. Accordingly, packets will not be sent to the middlebox unless routing policies are specified (e.g., by a user such as a network administrator) for the logical router 115 that determine which packets should be sent to the middlebox for processing. Some embodiments enable the use of policy routing rules, which forward packets based on data beyond the destination address (e.g., destination IP or MAC address). For example, a user might specify (e.g., through a network controller application programming interface (API)) that all packets with a source IP address in the logical subnet switched by logical switch 105 or all packets that enter the network from the external network 195 destined for the logical subnet switched by the logical switch 110, should be directed to the middlebox 140 for processing.

Different middleboxes may perform different functionalities within the network. For instance, a firewall analyzes data packets to determine whether or not the packets should be allowed through (i.e., similar to ACL flow entries). The firewall stores a set of rules (e.g., entered by a user), that determine whether or not the firewall drops (i.e., discards) or allows the packet through (or, in some cases, rejects the packet by dropping the packet and sending an error response back to the sender). In some embodiments, the firewall is a stateful firewall that keeps track of transport (e.g., TCP and/or UDP) connections, and uses the stored state information to allow the packets that belong to an open transport connection to pass through.

Source network address translation (SNAT) modifies the source IP address of packets in the packet headers. For instance, SNAT may be used so that the IP addresses of numerous different machines with different IP addresses can be hidden from destination machines by changing the source of packets from the different machines to a single IP address. Destination network address translation (D-NAT) similarly modifies the destination IP address of packets in order to hide the real IP addresses from the source machines. Load balancing is a form of D-NAT that uses various algorithms (e.g., round robin, random assignment, etc.) to balance traffic across numerous destination machines. A load balancer receives a packet for a specific IP address that is exposed to the source machine and modifies the destination IP address of the packet to match up with a particular one of the destination machines selected by the load balancing algorithm.

An intrusion detection system (IDS) is a passive middlebox in some embodiments that monitors the logical network for malicious activities or policy violations. The IDS may examine transport connections (e.g., TCP connections, UDP connections, etc.) to determine whether an attack on the network is occurring.

A WAN optimizer is a middlebox device for increasing the efficiency of data transfers across a WAN (e.g., accelerating the flow of data across the WAN). Examples of WAN optimization techniques include data deduplication, data compression, latency optimization, caching and/or proxying, forward error correction, protocol spoofing, traffic shaping, equalizing, connection limiting, simple rate limiting, etc. While the above is a list of some of the several different middleboxes, one of ordinary skill in the art will recognize that some embodiments may include various different middleboxes that may be implemented in a distributed manner.

The bottom half of FIG. 1 conceptually illustrates such a distributed implementation 150 of some embodiments. Specifically, the bottom half of this figure illustrates several nodes, including a first host machine 155, a second host machine 160, a third host machine 165, and an Nth host machine 170. Each of the first three nodes hosts several virtual machines of the network 100, with virtual machine 120 hosted on the first host machine 155, virtual machines 125 and 135 hosted on the second host machine 160, and virtual machine 130 hosted on the third host machine 165.

In addition, each of the host machines includes a managed switching element ("MSE"). The managed switching elements of some embodiments are software forwarding elements that implement logical forwarding elements for one or more logical networks. For instance, the MSEs in the hosts 155-170 include flow entries in forwarding tables that implement the logical forwarding elements of the network 100. Specifically, the MSEs on the host machines implement the logical switches 105 and 110, as well as the logical router 115. On the other hand, some embodiments only implement logical switches at a particular node when at least one virtual machine connected to the logical switch is located at the node (i.e., only implementing logical switch 105 and logical router 115 in the MSE at host 155).

The implementation 150 of some embodiments also includes a pool node 195 that connects to the host machines. In some embodiments, the MSEs residing on the host perform first-hop processing. That is, these MSEs are the first forwarding elements a packet reaches after being sent from a virtual machine, and attempt to perform all of the logical switching and routing at this first hop. However, in some cases, a particular MSE may not store flow entries containing all of the logical forwarding information for a network, and therefore may not know what to do with a particular packet. In some such embodiments, the MSE sends the packet to a pool node 195 for further processing. These pool nodes are interior managed switching elements which, in some embodiments, store flow entries that encompass a larger portion of the logical network than the edge software switching elements.

Similar to the distribution of the logical switching elements across the hosts on which the virtual machines of network 100 reside, the middlebox 140 is distributed across middlebox elements on these hosts 155-165. In some embodiments, a middlebox module (or set of modules) resides on the host machines (e.g., operating in the hypervisor of the host, etc.). When the user sets up the logical network (e.g., network 100), the input includes a configuration from the middlebox. For instance, for a firewall, the user would input a set of rules for packet filtering (e.g., based on IP address, TCP connection, etc.). In some embodiments, the network control system that is used to provision the managed switching elements to implement the logical forwarding elements may also be used to provision the various middlebox elements operating on the host machines. When the user inputs the middlebox configuration into a controller of the network control system, the controller identifies the particular nodes over which the middlebox configuration should be implemented, and distributes the configuration to these nodes (e.g., through a set of controllers).

When one of the virtual machines sends a packet (e.g., to another one of the virtual machines, to an external address, etc.), the packet initially goes to the local MSE for processing. The MSE may use its stored flow entries to make a forwarding decision to send the packet to the middlebox, in which case, some embodiments send the packet to the local middlebox element (i.e., a distributed middlebox instance) on the same host. In some embodiments, the middlebox element and the MSE negotiate a software port through which to transfer packets with minimal delay. After the middlebox processes the packet, some embodiments then send the packet back to the MSE through this same port. In some embodiments, this packet is sent from the middlebox to the MSE as a new packet, and therefore requires new processing by the MSE. In some situations, however, no packets are sent back. For instance, if the middlebox is a firewall, the middlebox may block or drop the packet. In addition, some embodiments of the middlebox are passive, and duplicates of the packets are sent to the middlebox in order for the middlebox to keep track of statistics, but are not sent back to the switching element.

While FIG. 1 illustrates only one logical network implemented across the hosts 155-170, some embodiments implement numerous logical networks (e.g., for different users or tenants) across the set of hosts. As such, a middlebox element on a particular host might actually store configurations for several different firewalls belonging to several different logical networks. For example, a firewall element may be virtualized to implement two (or more) different firewalls. These will effectively operate as two separate middlebox instances, such that the middlebox element is sliced into several "virtual" middleboxes (of the same type). In addition, when the MSE on the host sends packets to the middlebox, some embodiments append (e.g., prepend) a slice identifier (or tag) on the packet to identify to which of the several virtual middleboxes the packet is being sent. When multiple middleboxes are implemented on the same middlebox element for a single logical network (e.g., two different load balancers), the slice identifier will need to identify the particular middlebox slice rather than just the logical network to which the packet belongs. Different embodiments may use different slice identifiers for the middleboxes.

In some cases, more than one VM of the same logical network may be running in the same host. In such cases, the slice identifier that identifies a virtual middlebox serving for the logical network may not be sufficient to identify middlebox state for each of the VMs running in the same host. Some embodiments provide a VM-specific identifier for identifying the middlebox state of each of the VMs. In some embodiments, the MSE that forwards packets between these VMs and the virtual middlebox provides the VM-specific identifiers for the VMs. As will be described further below, the VM-specific identifiers are used to extract the state information of a particular VM when the particular VM migrates from one host to another host.

Examples of middleboxes that may be distributed include firewalls, SNATs, and load balancers. In each of these cases, the middlebox plays an active role in the packet processing (i.e., SNATs and load balancers modify source and destination addresses of the packets, respectively, while firewalls make decisions as to whether to allow or drop packets). However, each of these middlebox elements on a particular node can function on its own without requiring information from the corresponding middlebox elements on the other nodes. Even distributed load balancer elements can each separately load balance incoming traffic across different virtual machines with the assumption that none of the virtual machines are likely to become overloaded so long as the other load balancer elements use the same algorithm. Nevertheless, in some embodiments, the load balancer elements will share state (e.g., after querying the destination virtual machines for usage and health statistics) at some level.

B. Middlebox State Migration Using VM Migration Manager

Some types of middleboxes establish state for connections between machines (e.g., between two virtual machines in the network, between a VM in the network and an external machine, etc.). In some embodiments, the middlebox establishes a state for each transport layer connection (e.g., TCP connection, UDP connection). In the distributed case of some embodiments, a middlebox element operating at a particular host machine creates state for the transport connections passing through it, but does not need to share this state with the other middlebox elements operating on the other host machines. When the state only applies to the virtual machines hosted on the particular host machine, and the middlebox does not need to perform any analysis using state information established for other VMs, then the state does not have to be shared. Examples of state information that does not have to be shared among the middlebox elements include the transport connection state (e.g., IP addresses and ports, TCP sequence numbers, etc.), mapping between original and translated addresses and port numbers, timestamps for detecting dead connections, etc.

Figure 2:
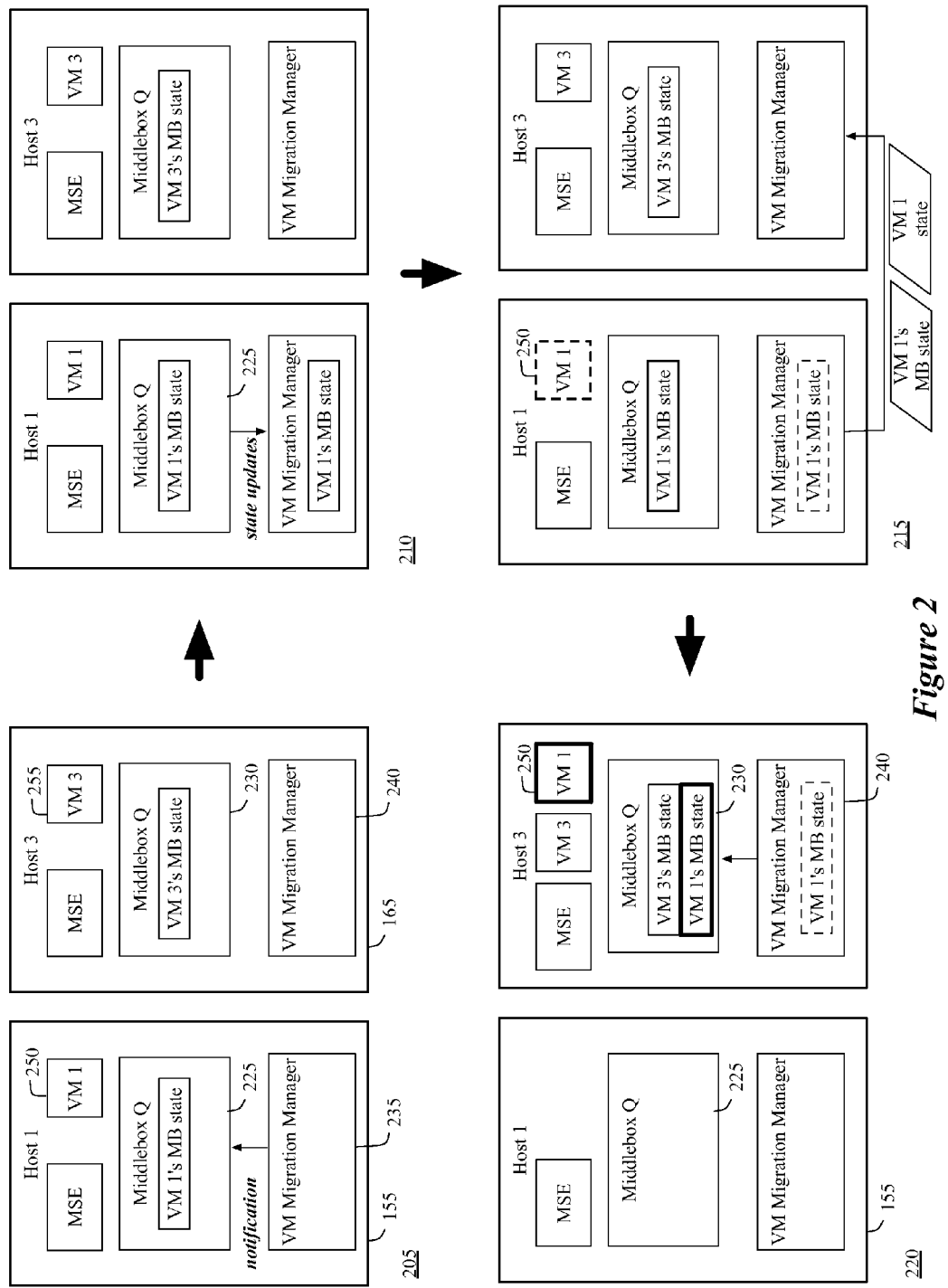
FIG. 2 illustrates an example middlebox state migration from a source host to a destination host as a VM is migrating from the source host to the destination host.

However, when a VM migrates from a source host to a destination host, the middlebox state related to the VM needs to be brought into the destination host in order for the migrated VM to resume its function at the destination host. For instance, the transport connection state for the migrated VM is needed at the destination host to prevent the transport connections from breaking As mentioned above, a middlebox element providing a middlebox service to a co-hosted VM sends the state related to the VM to another host to which the VM is migrating. FIG. 2 illustrates an example middlebox state migration from a source host to a destination host as a VM is migrating from the source host to the destination host. In particular, this figure illustrates in terms of four different stages 205-220 that a middlebox element running in a host uses a VM migration manager to send state to another middlebox element running in another host.

In some embodiments, a VM migration manager is a software application running in a host that manages migration of a VM into or out of the host. A VM migration manager is part of a hypervisor of the host, which provisions and manages the VMs in the host in some embodiments. In other embodiments, the VM migration manager is a stand-alone software application. VM migration managers running in different hosts cooperate when migrating VMs to and from the different hosts. In some embodiments, a VM migration manager of a host communicates with other software components (e.g., middlebox elements and MSEs) running in the host to gather any state related to a VM that is migrating to another host and sends the gathered state to the other host along with the VM.

This figure illustrates two hosts 155 and 165 described above by reference to FIG. 1. Implementation of the logical forwarding elements of the logical network topology 100 in the MSEs of the hosts 155 and 165 are not depicted for simplicity of illustration. FIG. 2 also illustrates that the middlebox elements 225 and 230 in the hosts 155 and 165 maintain the middlebox state of the VMs located on the same host as the middlebox element. In addition, this figure illustrates that the hosts 155 and 165 each have a VM migration manager.

At the first stage 205, the VM migration manager 235 of the host 155 pre-notifies the middlebox element 225 that VM 1 that is currently running in the host 155 is going to be migrated to another host. In some embodiments, the network control system configures the middlebox element running in a host in such a way that the middlebox registers for a callback from the VM migration manager in the event of VM migration. Configuring a middlebox element will be described in detail further below by reference to FIGS. 7 and 8. In this example, the middlebox element 225 is configured to register for a callback from the VM migration manager 235 and thus the VM migration manager 235 sends a pre-notification to the middlebox element 225.

At the second stage 210, the middlebox element 225 identifies the middlebox state related to the VM 250 and sends the state to the VM migration manager 235. In some embodiments, a VM running in a host is associated with a slice identifier for identifying a particular slice of the middlebox element that performs middlebox service on the packets coming to and from a VM that belongs to a particular logical network. As mentioned above, in some embodiments, this slice identifier is for appending to the packets. In addition, a VM running in a host is associated with a VM-specific identifier when another VM that belongs to the same logical network is running in the same host. As mentioned above, this VM-specific identifier is for identifying the VM-specific middlebox state within the identified slice of the middlebox element. The middlebox element of some embodiments uses the VM-specific identifier and the slice identifier to identify the slice of the middlebox element for the VM and gathers the state for the VM from the identified slice.

The middlebox element of some embodiments sends the gathered state for the VM and sends the state to the VM migration manager. Also, as the VM continues to function in the source host, the state related to the VM may also change. The middlebox element identifies these changes and sends the changes to the VM migration manager until the VM migration manager stuns the VM to move the VM to the destination host.

The third stage 215 shows that the VM migration manager 235 has stunned the VM 250 and is sending the middlebox state of the VM 250 and the VM 250 (e.g., the VM's state) to the host 165, which is the destination host to which the VM 250 is migrating in this example. In some embodiments, the VM migration manager of the source host sends the middlebox state and the VM state to the VM migration manager of the destination host. The VM migration manager at the destination host provisions the migrating VM in the destination host and provides the middlebox state to the middlebox element running in the destination host.

The fourth stage 220 shows that the VM migration manager 240 of the host 165 has received the state from the VM migration manager 235 of the host 155 and has sent the middlebox state to the middlebox element 230 of the host 165. In some embodiments, the network control system configures the middlebox element running in a host in such a way that the middlebox registers for a callback from the VM migration manager in the event of a new VM being provisioned in the host. In this example, the middlebox element 230 is configured to register for such a callback from the VM migration manager 240 and thus the VM migration manager 240 sends a pre-notification to the middlebox element 230. Also, the VM migration manager 240 sends the middlebox state of the migrating VM 250 along with the pre-notification. The VM migration manager 240 also starts the VM 250 in the host 165. The middlebox element 230 of some embodiments creates a middlebox slice for VM 250 (if there is not a slice of the middlebox element for the logical network that the VM 250 belongs to) and uses the middlebox state received from the VM migration manager 240 to resume the middlebox service to the VM 250.

The fourth stage 220 also shows that the VM 250 is not in the host 155 and the middlebox element 225 does not have the middlebox state for the VM 250. In some embodiments, the middlebox element of the source host explicitly deletes the middlebox state related to the VM migrated out of the source host. Alternatively or conjunctively, the middlebox element of the source host lets the middlebox state of the migrated VM expire (e.g., by garbage-collecting the middlebox states that have an expired time to live (TTL)).

Figure 3:
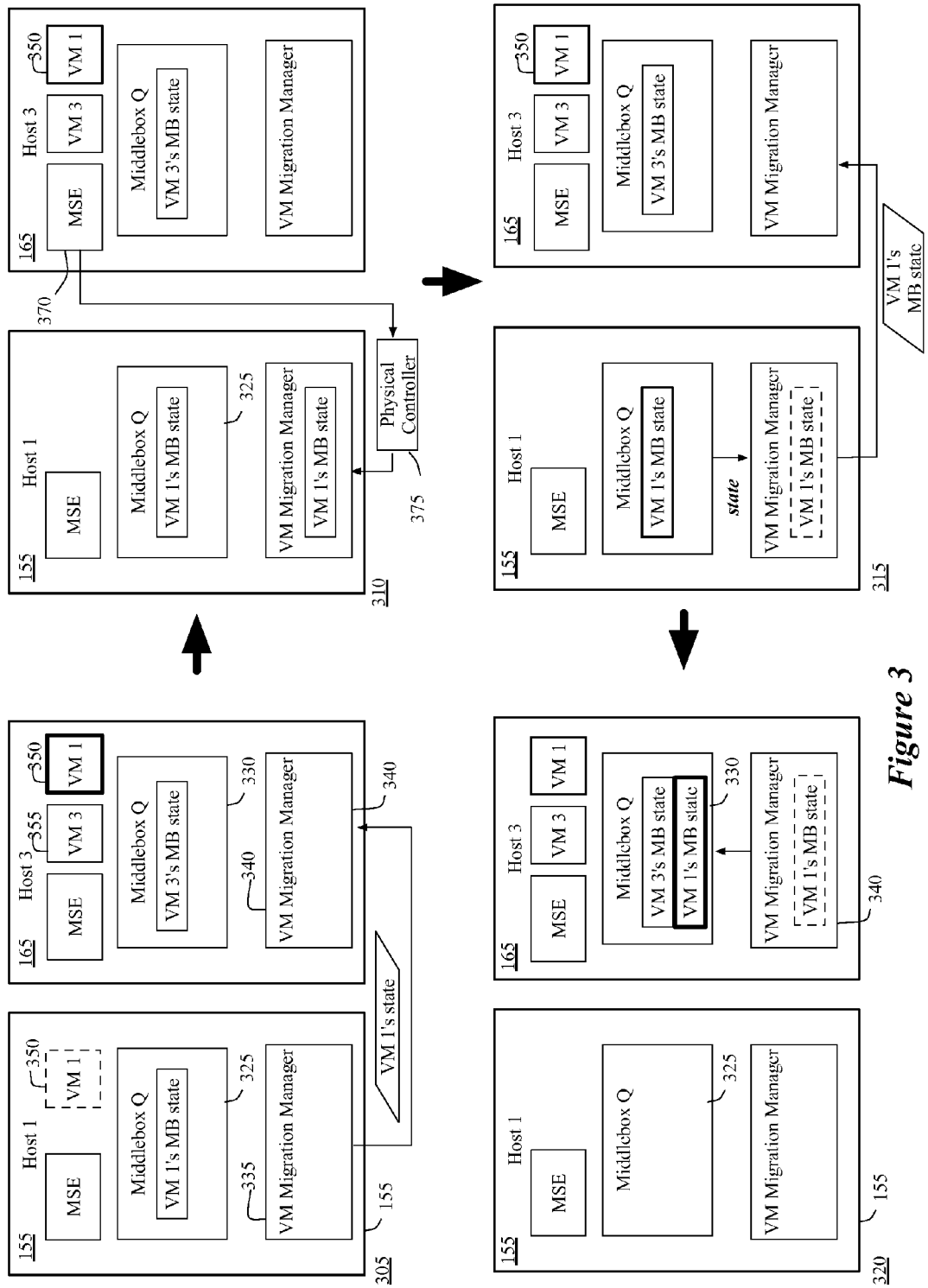
FIG. 3 illustrates an example middlebox state migration from a source host to a destination host after a VM has migrated from the source host to the destination host.

FIG. 3 illustrates in four stages 305-320 an example middlebox state migration from a source host to a destination host after a VM has migrated from the source host to the destination host. In this example, the middlebox element running in the source host uses a VM migration manager to send state to another middlebox element running in another host. However, the VM migration manager in this example does not send a pre-notification for imminent VM migration to the middlebox element.

This figure illustrates two hosts 155 and 165 described above by reference to FIG. 1. Implementation of the logical forwarding elements of the logical network topology 100 in the MSEs of the hosts 155 and 165 are not depicted for simplicity of illustration. FIG. 3 also illustrates that the middlebox elements 325 and 330 in the hosts 155 and 165 maintain the middlebox state of the VMs located on the same host as the middlebox element. In addition, this figure illustrates that the hosts 155 and 165 each have a VM migration manager.

The first stage 305 also shows that the VM migration manager 335 of the host 155 has migrated VM 350 from the host 155 to the host 165 without sending a pre-notification to the middlebox element 325 before the migration of the VM 350.

At the second stage 310, the MSE 370 detects the migration of the VM 350 into the host 165. In some embodiments, the MSE of the destination host detects a new VM being coupled to the MSE and creates a new port to forward packets to and from the new VM. The MSE of the destination host also reports the addition of a new VM to a physical controller that manages the MSE. The physical controller in turn asks the VM migration manager of the source host to fetch the middlebox state related to the migrated VM and send the state to the destination host. In some embodiments, a physical controller is a controller responsible for managing a set of MSEs in different hosts. A physical controller will be further described below by reference to FIGS. 7 and 8.

At the third stage 315, the middlebox element 325 identifies the middlebox state related to the VM 350 (e.g., by using a slice identifier and/or a VM-specific identifier described above) and sends the state to the VM migration manager 335. The VM migration manager 335 then sends the middlebox state to the VM migration manager 340 of the destination host 165.

The fourth stage 320 shows that the VM migration manager 340 of the host 165 has received the state from the VM migration manager 335 of the host 155 and has sent the middlebox state to the middlebox element 330 of the host 165. The middlebox element 330 of some embodiments creates a middlebox slice for VM 350 (if there is not a slice of the middlebox element for the logical network that the VM 350 belongs to) and uses the middlebox state received from the VM migration manager 340 to resume the middlebox service to the VM 350.

C. Middlebox State Migration Using State Sharing Manager

As mentioned above, a middlebox element in a host may need to share middlebox state with the corresponding middlebox elements on the other hosts. Some embodiments include a state sharing manager that facilitates the sharing of middlebox state among middlebox elements in different hosts that implement a middlebox in a distributed manner. In particular, the state sharing manager maintains shared middlebox state that is accessible to a middlebox element. In some embodiments, the state sharing manager provides a set of application programming interface (API) calls that allow the middlebox element to (1) send middlebox state to the state sharing manager for sharing, (2) get middlebox state that the middlebox element needs from the state sharing manager, (3) remove some state from the state sharing manager so that the state is not shared, and (4) get middlebox state regarding middlebox element configuration.

Figure 4:
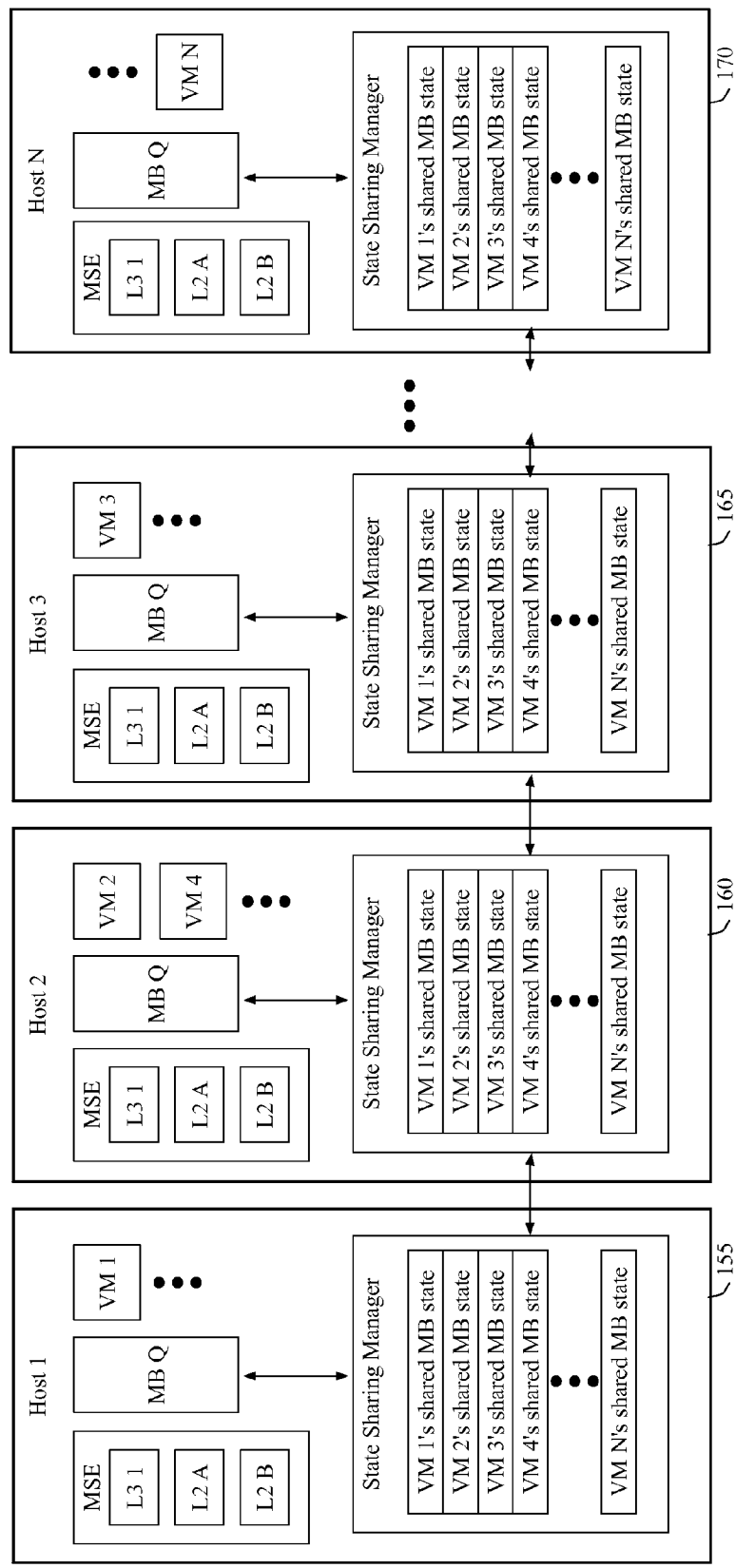
FIG. 4 illustrates an example of such a state sharing mechanism.

FIG. 4 illustrates an example of such a state sharing mechanism. Specifically, this figure illustrates a state sharing manager that is running in the same host as a middlebox element that implements a middlebox in a distributed manner. This figure illustrates hosts 155-170 described above by reference to FIG. 1. As shown in FIG. 4, each of the hosts 155-170 includes a state sharing manager in addition to an MSE, a middlebox element, and one or more VMs.

As shown, the state sharing manager in each of the hosts includes middlebox (MB) state for VMs in the hosts 155-170. This is because the middlebox element running in each host has sent middlebox state related to the VMs located on the same host as the middlebox element to the state sharing manager running in the host. Depending on the type of middlebox that these middlebox elements implement in a distributed manner, the middlebox element sends all or only a portion of the middlebox state related to a VM to the state sharing manager. In some embodiments, the state sharing managers running in different hosts send state directly to each other so that the middlebox element in one host can get middlebox state from the corresponding middlebox of another host as demanded.

In some embodiments, the network control system configures a middlebox element in a source host in such a way that the middlebox element uses the state sharing manager and the VM migration manager to send middlebox state related to a VM in the source host to the corresponding middlebox element in a destination host to which the VM migrates.

Figure 5:
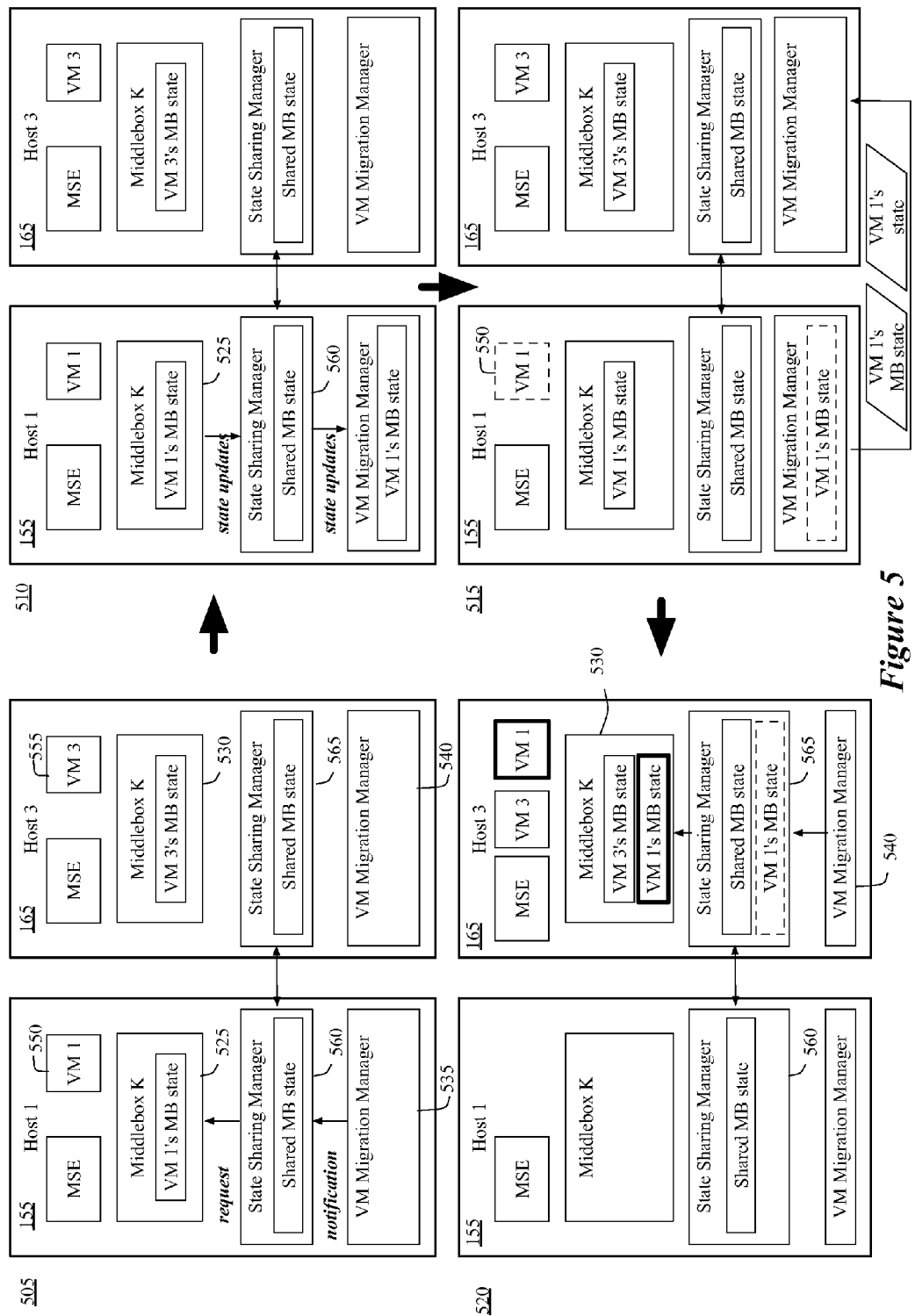
FIG. 5 illustrates an example middlebox state migration from a source host to a destination host as VM is migrating from the source host to the destination host.

FIG. 5 illustrates an example middlebox state migration from a source host to a destination host as VM is migrating from the source host to the destination host. In particular, this figure illustrates in terms of four different stages 505-520 that a middlebox element running in a host uses a state sharing manager and a VM migration manager to send state to another middlebox element running in another host.

This figure illustrates two hosts 155 and 165 described above by reference to FIG. 1. Implementation of the logical forwarding elements of the logical network topology 100 in the MSEs of the hosts 155 and 165 are not depicted for simplicity of illustration. FIG. 5 also illustrates that the middlebox elements 525 and 530 in the host 155 and 165 maintain the middlebox state of the VMs located on the same host as the middlebox element. In addition, this figure illustrates that the hosts 155 and 165 each have a state sharing manager and a VM migration manager.

The middlebox state can be categorized into two types. The first type of state includes information that is useful to more than one non-backup middlebox instance. An example of such type of state is health information of a set of servers or a mapping of a virtual IP address to a list of real IP addresses of a set of servers when the middlebox instances provide a load balancing service. Usually, all of the middlebox instances that together provide the load balancing service need the health information.

The second type of state includes information that is useful only for a middlebox element in one host. An example of such type of state is a mapping of a source IP address and a real IP address of a server when the middlebox instance is providing a load balancing service. Unless another host is a back-up host running a back-up middlebox instance, this mapping of addresses is not useful for another middlebox instance running in another host because the VM whose IP address is the source IP address does not exist in the other host. Therefore, this type of state usually does not have to be shared by the middlebox instances running in different hosts because other middlebox instances do not need it. This type of state is referred to as "local-only" state.

Depending on the middlebox service that the middlebox instances provide, the portion of middlebox state that is of the first type for a particular VM varies. For instance, the middlebox instances providing an IDS service have more of the first type of state because the middlebox instances need to monitor network activities in different hosts to detect a possible attack. The middlebox instances providing a load balancing service have mostly local-only state and little of the first type of state that is useful to be shared by the middlebox instances.

In some embodiments, the middlebox element proactively sends the first type of the middlebox state to the state sharing manager so that different middlebox elements in different hosts can share that type of middlebox state.

At the first stage 505, the VM migration manager 535 of the host 155 pre-notifies the state sharing manager 560 that VM 550 that is currently running in the host 155 is going to be migrated to another host. In some embodiments, the network control system configures the state sharing manager running in a host in such a way that the state sharing manager registers for a callback from the VM migration manager in the event of VM migration. In this example, the state sharing manager 560 is configured to register for a callback from the VM migration manager 535 and thus the VM migration manager 535 sends a pre-notification to the state sharing manager 560.

As shown in the first stage 505, the state sharing manager 560 maintains only the first type of middlebox state for the VM 550 located on the same host as the state sharing manager 560 because the middlebox element 525 has proactively sent only the first type of the middlebox state related to the VM 550. The state sharing manager asks for the rest of the middlebox state related to the VM 550. That is, the state sharing manager asks for the local-only state in order to have a complete middlebox state for the VM 550. When the middlebox element 525 is the type of middlebox that shares all or most of the state, there is nothing or not much more state to ask for from the middlebox element 525.

At the second stage 510, the middlebox element 525 identifies the middlebox state that is local-only state related to the VM 550 in order to fulfill the request from the state sharing manager 560. As mentioned above, the middlebox element of some embodiments uses the slice identifier and/or the VM-specific identifier to identify the middlebox state related to the VM in the middlebox element. The middlebox element gathers the state for the VM from the slice that includes the state.

The middlebox element of some embodiments sends the gathered local-only state for the VM to the state sharing manager by e.g., using one of the API calls that the state sharing manager supports. In some embodiments, the state sharing manager does not share the local-only state with other state sharing managers in other hosts. In some embodiments, the state sharing manager sends the local-only state to the VM migration manager. In other embodiments, the middlebox element directly sends the local-only middlebox state to the VM migration manager. Regardless of whether the middlebox element or the state sharing manager sends the local-only state to the VM migration manager, the VM migration manager of some embodiments is responsible for sending only the local-only state to the destination host in these embodiments.

As the VM continues to function in the source host, the state related to the VM also changes. The middlebox element identifies local-only changes and sends these changes to the state to the VM migration manager directly or via the state sharing manager. The middlebox element identifies changes to the first type of state and sends this to the state sharing manager so that the state sharing manager shares changes to the first type of state with other state sharing managers in other hosts. The middlebox element sends out the updates to the states until the VM migration manager stuns the VM to move the VM to the destination host.

The third stage 515 shows that the VM migration manager 515 has stunned the VM 550 and is sending the local-only middlebox state of the VM 550 and the VM 550 (e.g., the VM's state) to the host 165, which is the destination host to which the VM 550 is migrating in this example. In some embodiments, the VM migration manager of the source host sends the middlebox state and the VM state to the VM migration manager of the destination host. The VM migration manager at the destination host provisions the migrating VM in the destination host. The VM migration manager at the destination host provides the middlebox state to the state sharing manager running in the destination host or to the middlebox element running in the destination host.

The fourth stage 520 shows that the VM migration manager 540 of the host 165 has received the local-only state from the VM migration manager 535 of the host 155 and has sent the middlebox state to the state sharing manager 565 of the host 165. The state sharing manager 565 then signals the middlebox element 530 of the host 165 that middlebox state for a new slice for the VM 550 have arrived. In some embodiments, the middlebox element 530 then obtains the local-only middlebox state related to the migrated VM 550 from the state sharing manager 565 by, e.g., making an API call that the state sharing manager supports. In other embodiments, the middlebox element 530 may get the local-only middlebox state from the VM migration manager 540 directly. The middlebox 530 of some embodiments gets the first type of middlebox state through the state sharing manager 565.

The middlebox element 530 of some embodiments creates a middlebox slice for VM 550 (if there is not a slice of the middlebox element for the logical network that the VM 550 belongs to) and uses the middlebox state to resume the middlebox service to the VM 550. The middlebox element 530 of some embodiments then sends an acknowledgement to the state sharing manager 565. Once the middlebox state related to the migrated VM 550 are restored in the middlebox element 530, the state sharing manager 565 in some embodiments sends an acknowledgement to the VM migration manager 540. In other embodiments, the middlebox element 530 sends the acknowledgement directly to the VM migration manager. Upon receiving acknowledgement from the middlebox element 530 or the state sharing manager 565, the VM migration manager 540 starts the VM 550 in the host 165.

The fourth stage 520 also shows that the VM 550 is not in the host 155 and the middlebox element 525 does not have the middlebox state for the VM 550. In some embodiments, the middlebox element of the source host explicitly deletes the middlebox state related to the VM migrated out of the source host. Alternatively or conjunctively, the middlebox element of the source host lets the middlebox state of the migrated VM expire (e.g., by garbage-collecting the middlebox state that has an expired time to live (TTL)). The state sharing manager 560 of the source host 155 may keep the shared middlebox state, which the middlebox element 525 had proactively shared at the first stage 505, in the host 155 so that middlebox element 525 can get and use the state for other VMs (not shown) running in the host 155.

Figure 6:
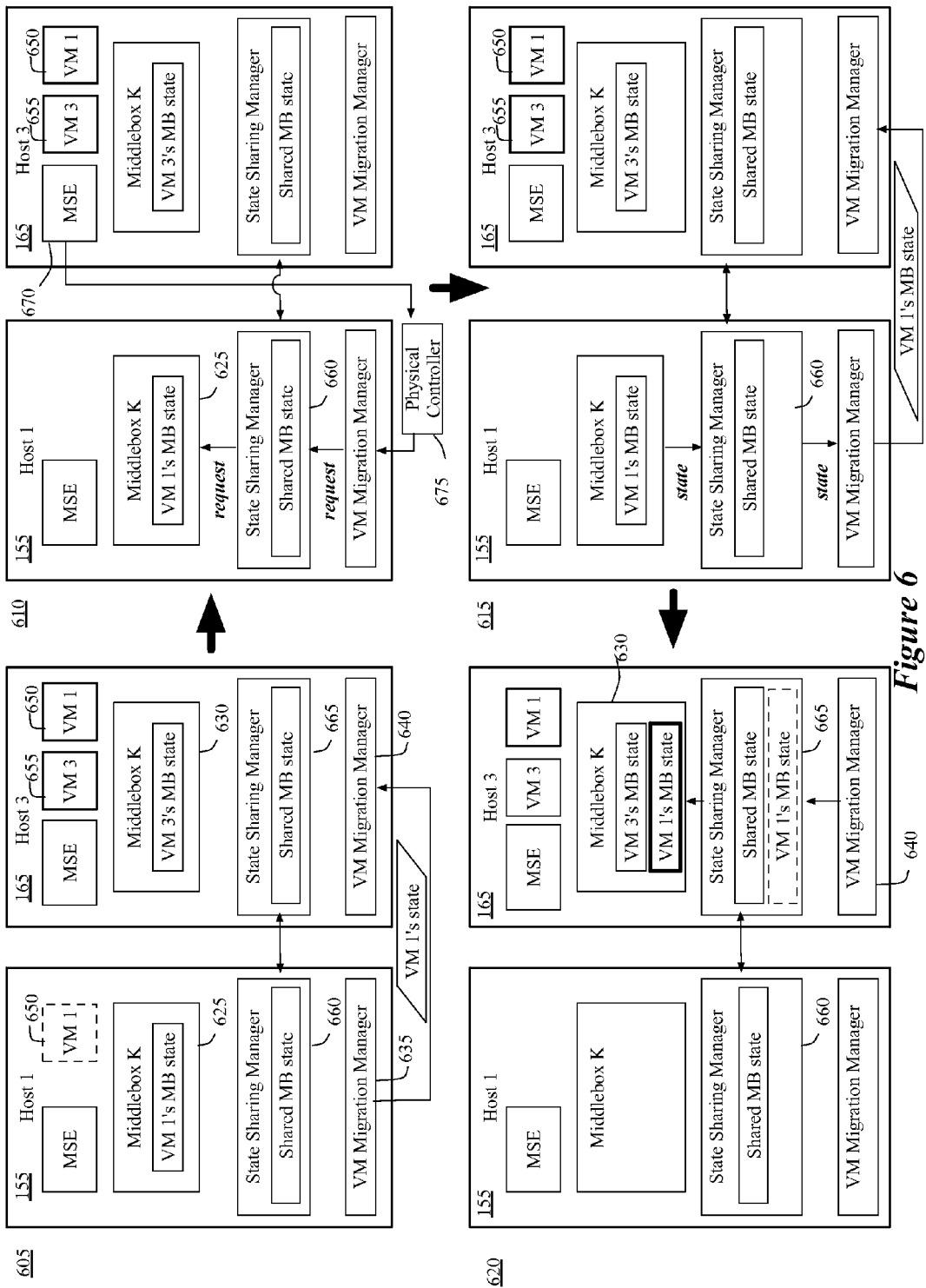
FIG. 6 illustrates an example middlebox state migration from a source host to a destination host after VM has migrated from the source host to the destination host.

FIG. 6 illustrates in four stages 605-620 an example middlebox state migration from a source host to a destination host after VM has migrated from the source host to the destination host. In this example, the middlebox element running in the source host uses a state sharing manager and a VM migration manager to send state to another middlebox element running in another host. However, the VM migration manager in this example does not send a pre-notification for imminent VM migration to the middlebox element or the state sharing manager.

This figure illustrates two hosts 155 and 165 described above by reference to FIG. 1. Implementation of the logical forwarding elements of the logical network topology 100 in the MSEs of the hosts 155 and 165 are not depicted for simplicity of illustration. FIG. 6 also illustrates that the middlebox elements 625 and 630 in the hosts 155 and 165 maintain the middlebox state of the VMs located on the same host as the middlebox element. In addition, this figure illustrates that the hosts 155 and 165 each have a state sharing manager and a VM migration manager.

As shown in the first stage 605, the state sharing manager 660 has been maintaining the middlebox state for the VM 650. As mentioned above, the middlebox element proactively sends the first type of middlebox state to the state sharing manager. In this example, the middlebox element 625 has sent only the first type of the middlebox state related to the VM 650. The first stage 605 also shows that the VM migration manager 635 of the host 155 has migrated VM 650 from the host 155 to the host 165 without sending a pre-notification to the state sharing manager 660 or the middlebox element 625 before the migration of the VM 650.

At the second stage 610, the MSE 670 detects the migration of the VM 650 into the host 165. In some embodiments, the MSE of the destination host detects a new VM being coupled to the MSE and creates a new port to forward packets to and from the new VM. The MSE of the destination host also reports the addition of a new VM to a physical controller that manages the MSE. The physical controller in turn asks the VM migration manager of the source host to fetch the middlebox state related to the migrated VM and send the state to the destination host.

The MSE 670 reports the addition of the VM 650 to the physical controller 675. The physical controller 675 then asks the VM migration manager 635 of the host 155 to gather the middlebox state related to the VM 650. The VM migration manager 635 of some embodiments then asks the state sharing manager 660 to provide the middlebox state for the VM 650.

At the third stage 615, the state sharing manager 660 gathers the middlebox state that the VM migration manager 635 asked for in the previous stage 610. As mentioned above, in some embodiments, the middlebox element proactively sends only the first type of the middlebox state to the state sharing manager. The state sharing manager 660 shares the first type of the middlebox state with the state sharing manager 665 of the host 165. On the other hand, the VM migration manager 635 receives the local-only middlebox state of the VM 650 from the middlebox element 625 directly or via the state sharing manager 660. The VM migration manager 635 then sends the middlebox state to the VM migration manager 640 of the destination host 165 as shown in the stage 615.

The fourth stage 620 shows that the VM migration manager 640 of the host 165 has received the state from the VM migration manager 635 of the host 155 and has sent the middlebox state to the middlebox element 630 directly or via the state sharing manager 665 of the host 165. The VM migration signals the middlebox element 630 of the host 165 (either directly or via the state sharing manager 665) that middlebox state for a new slice for the VM 650 has arrived. In some embodiments, the middlebox element 630 then obtains all the middlebox state related to the migrated VM 650 from the state sharing manager 665 by, e.g., making an API call that the state sharing manager supports. The middlebox element 630 of some embodiments creates a middlebox slice for VM 650 (if there is not a slice of the middlebox element for the logical network that the VM 650 belongs to) and uses the middlebox state to resume the middlebox service to the VM 650.

II. Network Control System

Section I above described a distributed middlebox implementation architecture and middlebox state migration. As mentioned above, in some embodiments, the middleboxes may be provisioned through a network control system that is also used to provision the MSEs that implement the logical forwarding elements of the network. In some embodiments, the network control system is a hierarchical set of network controllers.

Figure 7:
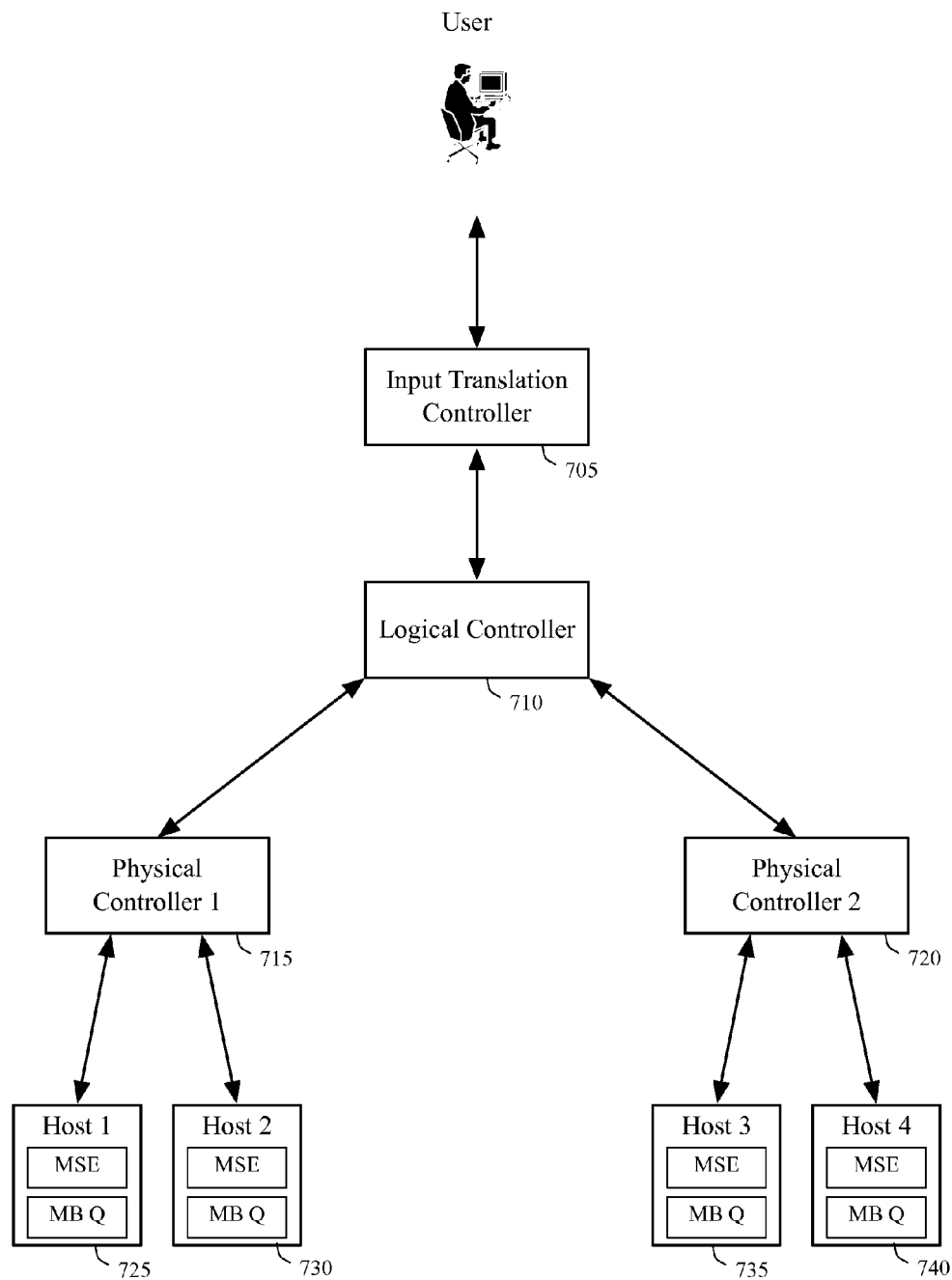
FIG. 7 illustrates a network control system of some embodiments for configuring MSEs and distributed middlebox elements in order to implement logical networks.

FIG. 7 illustrates a network control system 700 of some embodiments for configuring MSEs and distributed middlebox elements in order to implement logical networks. As shown, the network control system 700 includes an input translation controller 705, a logical controller 710, physical controllers 715 and 720, and hosts 725-740. As shown, the hosts 725-740 include both MSE and middlebox elements, which may be implemented as shown above in FIG. 5. One of ordinary skill in the art will recognize that many other different combinations of the various controllers and hosts are possible for the network control system 700.

In some embodiments, each of the controllers in a network control system has the capability to function as an input translation controller, logical controller, and/or physical controller. Alternatively, in some embodiments a given controller may only have the functionality to operate as a particular type of controller (e.g., as a physical controller). In addition, different combinations of controllers may run in the same physical machine. For instance, the input translation controller 705 and the logical controller 710 may run in the same computing device, with which a user interacts.

The input translation controller 705 of some embodiments includes an input translation application that translates network configuration information received from a user. For example, a user may specify a network topology such as that shown in FIG. 1, which includes a specification as to which machines belong in which logical domain. This effectively specifies a logical datapath set, or a set of logical forwarding elements. For each of the logical switches, the user specifies the machines that connect to the logical switch (i.e., to which logical ports are assigned for the logical switch). In some embodiments, the user also specifies IP addresses for the machines. The input translation controller 705 translates the entered network topology into logical control plane data that describes the network topology. For example, an entry might state that a particular MAC address A is located at a particular logical port N of a particular logical switch.

In some embodiments, each logical network is governed by a particular logical controller (e.g., logical controller 710). The logical controller 710 of some embodiments translates the logical control plane data into LFP data, and the LFP data into UPCP data. LFP data, in some embodiments, consists of flow entries described at a logical level. For the MAC address A at logical port N, LFP data might include a flow entry specifying that if the destination of a packet matches MAC A, forward the packet to port N.

The UPCP data of some embodiments is a data plane that enables the control system of some embodiments to scale even when it contains a large number of MSEs (e.g., thousands) to implement a logical datapath set. The UPCP abstracts common characteristics of different MSEs in order to express physical control plane data without considering differences in the MSEs and/or location specifics of the MSEs.

As stated, the logical controller 710 of some embodiments translates logical control plane data into LFP data (e.g., logical flow entries), then translates the LFP data into UPCP data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables, and the controller applications use a table mapping engine to translate between the data planes.

Each of the physical controllers 715 and 720 is a master of one or more MSEs (e.g., located within host machines). In this example, each of the two physical controllers are masters of two MSEs each. In some embodiments, a physical controller receives the UPCP information for a logical network and translates this data into CPCP information for the particular MSEs that the physical controller manages. In other embodiments, the physical controller passes the appropriate UPCP data to the MSE, which includes the ability (e.g., in the form of a chassis controller running on the host machine) to perform the conversion itself.

The UPCP to CPCP translation involves a customization of various data in the flow entries. For the example noted above, the UPCP would involve several flow entries. The first entry states that if a packet matches the particular logical datapath set (e.g., based on the packet being received at a particular logical ingress port), and the destination address matches MAC A, then forward the packet to logical port N. This flow entry will be the same in the universal and CPCPs, in some embodiments. Additional flows are generated to match a physical ingress port (e.g., a virtual interface of the host machine) to the logical ingress port N (for packets received from MAC A), as well as to match logical port N to the particular egress port of the physical MSE. However, these physical ingress and egress ports are specific to the host machine containing the MSE. As such, the UPCP entries include abstract physical ports while the CPCP entries include the actual physical ports involved.

In some embodiments, the network control system also disseminates data relating to the middleboxes of a logical network. The network control system may disseminate middlebox configuration data, data relating to the sending and receiving of packets to/from the middlebox elements at the MSEs and to/from the MSEs at the middleboxes, and data relating to the middlebox elements' interactions with the VM migration managers.

As shown in FIG. 7, the same network control system distributes data to distributed middleboxes in some embodiments. Several physical controllers are used to disseminate the configuration of a distributed middlebox. In this case, both the physical controllers 715 and 720 are assigned to disseminate the configuration for the distributed middlebox.

In order to incorporate the middleboxes, the flow entries propagated through the network control system to the MSEs will include entries for sending the appropriate packets to the appropriate middleboxes (e.g., flow entries that specify for packets having a source IP address in a particular subnet to be forwarded to a particular middlebox). In addition, the flow entries for the MSE will need to specify how to send such packets to the middleboxes. That is, once a first entry specifies a logical egress port of the logical router to which a particular middlebox is bound, additional entries are required to attach the logical egress port to the middlebox.

For the distributed middlebox, the packet does not have to actually leave the host machine in order to reach the middlebox. However, the MSE nevertheless needs to include flow entries for sending the packet to the middlebox element on the host machine. These flow entries, again, include an entry to match the logical egress port of the logical router to a port connecting to the middlebox element. However, in this case the middlebox element attaches to a software abstraction of a port in the MSE. The software abstraction of the port in the MSE is not attached to a port in the MSE. The flow entries in the MSE send packets to this software abstraction in order for the packets to be routed within the host machine to the middlebox element.

In some embodiments, the MSE adds slicing information to the packet. Essentially, this slicing information is a tag that indicates to which of the (potentially) several instances being run by the middlebox the packet should be sent. Thus, when the middlebox receives the packet, the tag enables the middlebox to use the appropriate set of rules for packet processing, analysis, modification, etc. in order to perform its operations on the packet. Some embodiments, rather than adding slicing information to the packet, define different ports of the MSE for each middlebox instance and essentially use the ports to slice the traffic destined for the middlebox element.

Figure 8:
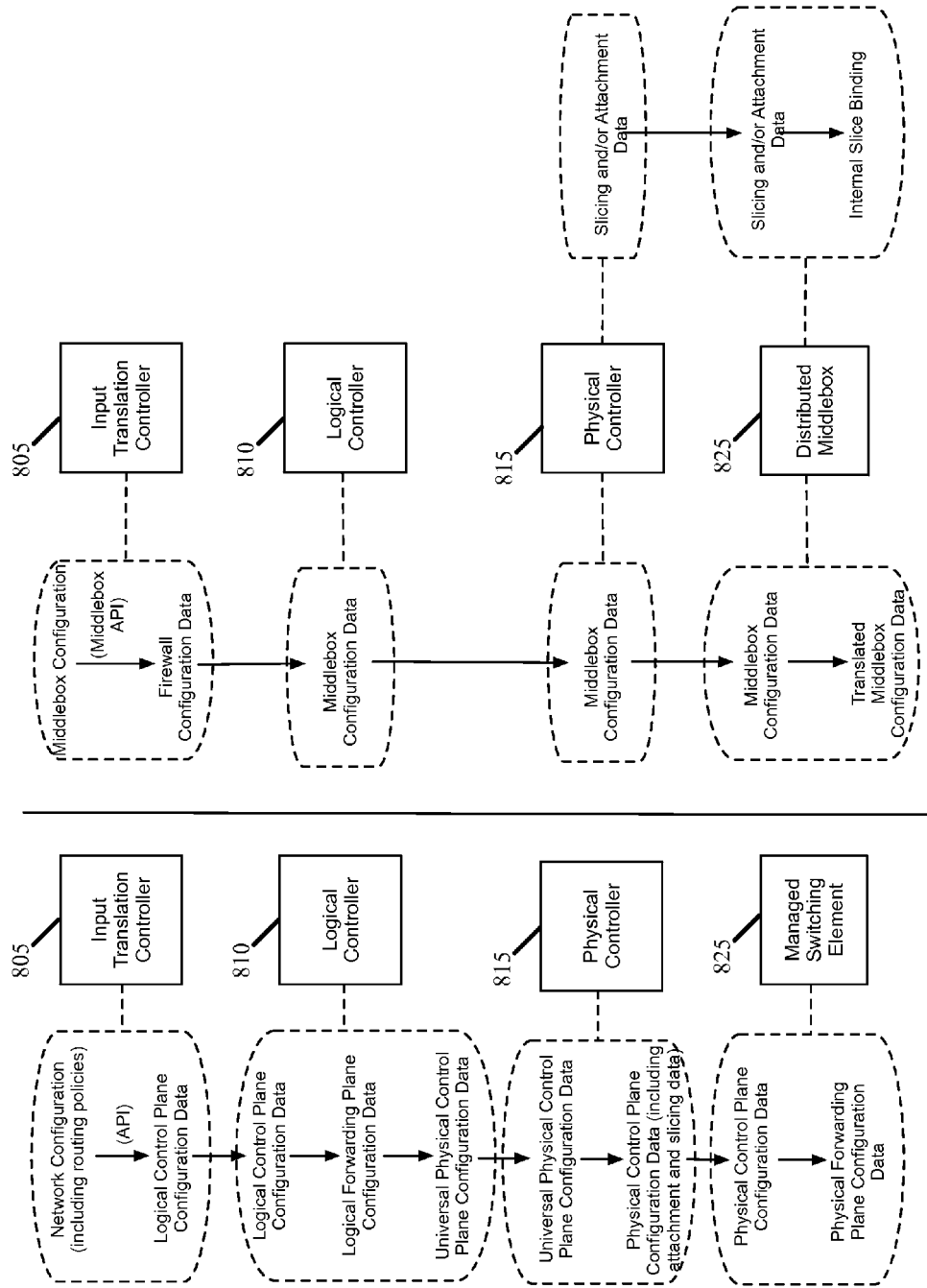
FIG. 8 conceptually illustrates the propagation of data through the network control system of some embodiments.

The above describes the propagation of the forwarding data to the MSEs. In addition, some embodiments use the network control system to propagate configuration data to the middleboxes. FIG. 8 conceptually illustrates the propagation of data through the network control system of some embodiments. On the left side of the figure is the data flow to the MSEs that implement a logical network, while the right side of the figure shows the propagation of both middlebox configuration data as well as network attachment and slicing data to the middleboxes.

On the left side, the input translation controller 805 receives a network configuration through an API, which is converted into logical control plane data. This network configuration data includes a logical topology such as that shown in FIG. 1. In addition, the network configuration data of some embodiments includes routing policies that specify which packets are sent to the middlebox. When the middlebox is located on a logical wire between two logical forwarding elements (e.g., between a logical router and a logical switch), then all packets sent over that logical wire will automatically be forwarded to the middlebox. However, for an out-of-band middlebox such as that in network architecture 100, the logical router will only send packets to the middlebox when particular policies are specified by the user.

Whereas routers and switches are normally configured to forward packets according to the destination address (e.g., MAC address or IP address) of the packet, policy routing allows forwarding decisions to be made based on other information stored by the packet (e.g., source addresses, a combination of source and destination addresses, etc.). For example, the user might specify that all packets with source IP addresses in a particular subnet or that have destination IP addresses not matching a particular set of subnets, should be forwarded to the middlebox.

As shown, the logical control plane data is converted by the logical controller 810 (specifically, by the control application of the logical controller) to LFP data, and then subsequently (by the virtualization application of the logical controller) to UPCP data. In some embodiments, these conversions generate a flow entry (at the LFP), then adds a match over the logical datapath set (at the UPCP). The UPCP also includes additional flow entries for mapping generic physical ingress ports (i.e., a generic abstraction of a port not specific to any particular physical host machine) to logical ingress ports as well as for mapping logical egress ports to generic physical egress ports.

The physical controller 815 (one of the several physical controllers), as shown, translates the UPCP data into CPCP data for the particular MSEs that it manages. This conversion involves substituting specific data (e.g., specific physical ports) for the generic abstractions in the UPCP data. For instance, in the example of the above paragraph, the port integration entries are configured to specify the physical layer port appropriate for the particular middlebox configuration. This port might be a virtual NIC if the middlebox element runs as a virtual machine on the host machine, or the previously-described software port abstraction within the MSE when the middlebox element runs as a process (e.g., daemon) within the hypervisor on the virtual machine. In some embodiments, for the latter situation, the port is an IPC channel or TUN/TAP device-like interface. In some embodiments, the MSE includes one specific port abstraction for the middlebox element and sends this information to the physical controller in order for the physical controller to customize the physical control plane flows.

In addition, in some embodiments the physical controller adds flow entries specifying slicing information particular to the middlebox. For instance, for a particular MSE, the flow entry may specify to add a particular tag (e.g., a VLAN tag or similar tag) to a packet before sending the packet to the particular middlebox element. This slicing information enables the middlebox element to receive the packet and identify which of its several independent instances should process the packet.

The MSE 725 (one of several MSEs managed by the physical controller 715) performs a translation of the CPCP data into physical forwarding plane data. The physical forwarding plane data, in some embodiments, are the flow entries stored within a switching element (either a physical router or switch or a software switching element) against which the switching element actually matches received packets.

The right side of FIG. 8 illustrates two sets of data propagated to a distributed middlebox rather than the MSEs. The first of these sets of data is the actual middlebox configuration data, that includes various rules specifying the operation of the particular logical middlebox. This data may be received at the input translation controller 805 or a different input interface, through an API particular to the middlebox implementation. In some embodiments, different middlebox implementations will have different interfaces presented to the user (i.e., the user will have to enter information in different formats for different particular middleboxes). As shown, the user enters a middlebox configuration, which is translated by the middlebox API into middlebox configuration data.

In some embodiments, the middlebox configuration data is a set of records, with each record specifying a particular rule. These records, in some embodiments, are in a similar format to the flow entries propagated to the MSEs. In fact, some embodiments use the same applications on the controllers to propagate the middlebox configuration records as for the flow entries, and the same table mapping language (e.g., nLog) for the records.

The middlebox configuration data, in some embodiments, is not translated by the logical or physical controller, while in other embodiments the logical and/or physical controller perform at least a minimal translation of the middlebox configuration data records. As many middlebox packet processing, modification, and analysis rules operate on the IP address (or TCP connection state) of the packets, and this information is exposed (i.e., not encapsulated within the logical port information) for packets sent to the middlebox, the middlebox configuration does not require translation from logical to physical data planes. Thus, the same middlebox configuration data is passed from the input translation controller 805 (or other interface), to the logical controller 810, to the physical controller 815.

In some embodiments, the logical controller 810 stores a description of the logical network and of the physical implementation of that physical network. The logical controller receives the one or more middlebox configuration records for a distributed middlebox, and identifies which of the various nodes (i.e., host machines) will need to receive the configuration information. In some embodiments, the entire middlebox configuration is distributed to middlebox elements at all of the host machines, so the logical controller identifies all of the machines on which at least one virtual machine resides whose packets require use of the middlebox. In general, the identified machines are the hosts for all of the virtual machines in a network (e.g., as for the middlebox shown in FIG. 1). However, some embodiments may identify a subset of the virtual machines in the network if the network topology is such that the middlebox will never be needed at certain host machines. Some embodiments make decisions about which host machines to send the configuration data to on a per-record basis. That is, each particular rule may apply only to a subset of the virtual machines (e.g., only packets originating from a particular virtual machine or subset of virtual machines), and only hosts running these virtual machines need to receive the record.

Once the logical controller identifies the particular nodes to receive the records, the logical controller identifies the particular physical controllers that manage these particular nodes. As mentioned, each host machine has an assigned master physical controller. Thus, if the logical controller identifies only first and second hosts as destinations for the configuration data, the physical controllers for these hosts will be identified to receive the data from the logical controller (and other physical controllers will not receive this data).

In order to supply the middlebox configuration data to the hosts, the logical controller of some embodiments pushes the data (using an export module that accesses the output of the table mapping engine in the logical controller) to the physical controllers. In other embodiments, the physical controllers request configuration data (e.g., in response to a signal that the configuration data is available) from the export module of the logical controller.

The physical controllers pass the data to the middlebox elements on the host machines that they manage, much as they pass the physical control plane data. In some embodiments, the middlebox configuration and the physical control plane data are sent to the same database running on the host machine, and the MSE and middlebox element retrieve the appropriate information from the database.

In some embodiments, the middlebox translates the configuration data. The middlebox configuration data will be received in a particular language to express the rules for packet processing, analysis, modification, etc. The middlebox of some embodiments compiles these rules into more optimized packet classification rules. In some embodiments, this transformation is similar to the physical control plane to physical forwarding plane data translation. When a packet is received by the middlebox, it applies the compiled optimized rules in order to efficiently and quickly perform its operations on the packet.

In addition to the middlebox configuration rules, the middlebox elements receive slicing and/or attachment information in order to receive packets from and send packets to the MSEs. This information corresponds to the information sent to the MSEs. As shown, in some embodiments the physical controller 815 generates the slicing and/or attachment information for the middlebox (i.e., this information is not generated at the input or logical controller level of the network control system).

For distributed middleboxes, the physical controllers, in some embodiments, receive information about the software port of the MSE to which the middlebox element connects from the MSE itself, then passes this information down to the middlebox element. In other embodiments, however, the use of this port is contracted directly between the middlebox element and the MSE within the host machine, so that the middlebox element does not need to receive the attachment information from the physical controller. In some such embodiments, the MSE nevertheless transmits this information to the physical controller in order for the physical controller to customize the UPCP flow entries for receiving packets from and sending packets to the middlebox element.

The slicing information generated by the physical controller, in some embodiments, consists of an identifier for the middlebox instance to be used for the particular logical network. In some embodiments, as described, the middlebox is virtualized for use by multiple logical networks. When the middlebox receives a packet from the MSE, in some embodiments the packet includes a prepended tag (e.g., similar to a VLAN tag) that identifies a particular one of the middlebox instances (i.e., a particular configured set of rules) to use in processing the packet.

As shown in FIG. 8, the middlebox translates this slicing information into an internal slice binding. In some embodiments, the middlebox uses its own internal identifiers (different from the tags prepended to the packets) in order to identify state (e.g., active TCP connections, statistics about various IP addresses, etc.) within the middlebox. Upon receiving an instruction to create a new middlebox instance and an external identifier (that is used on the packets) for the new instance, some embodiments automatically create the new middlebox instance and assign the instance an internal identifier. In addition, the middlebox stores a binding for the instance that maps the external slice identifier to the internal slice identifier.

Furthermore, each of the controllers illustrated in FIG. 8 is shown as a single controller. However, each of these controllers may actually be a controller cluster that operates in a distributed fashion to perform the processing of a logical controller, physical controller, or input translation controller.

Figure 9:
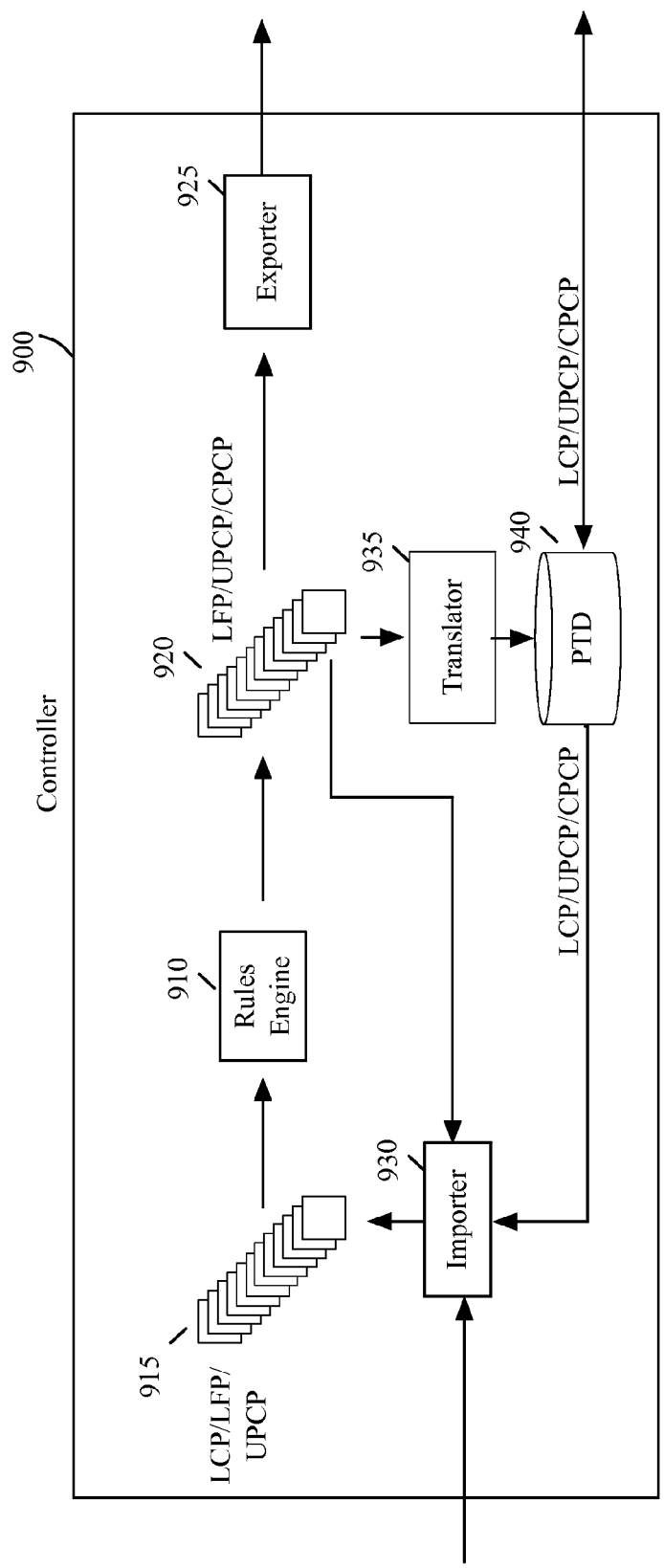
FIG. 9 illustrates example architecture of a network controller.

FIG. 9 illustrates an example architecture of a network controller (e.g., a logical controller or a physical controller) 900. The network controller of some embodiments uses a table mapping engine to map data from an input set of tables to data in an output set of tables. The input set of tables in a controller includes LCP data to be mapped to logical LFP data, LFP data to be mapped to UPCP data, and/or UPCP data to be mapped to CPCP data. The input set of tables may also include middlebox configuration data to be sent to another controller and/or a distributed middlebox instance. The network controller 900, as shown, includes input tables 915, a rules engine 910, output tables 920, an importer 930, an exporter 925, a translator 935, and a persistent data storage (PTD) 940.

In some embodiments, the input tables 915 include tables with different types of data depending on the role of the controller 900 in the network control system. For instance, when the controller 900 functions as a logical controller for a user's logical forwarding elements, the input tables 915 include LCP data and LFP data for the logical forwarding elements. When the controller 900 functions as a physical controller, the input tables 915 include LFP data. The input tables 915 also include middlebox configuration data received from the user or another controller. The middlebox configuration data is associated with a logical datapath set parameter that identifies the logical switching elements to which the middlebox to be is integrated.

In addition to the input tables 915, the control application 900 includes other miscellaneous tables (not shown) that the rules engine 910 uses to gather inputs for its table mapping operations. These miscellaneous tables include constant tables that store defined values for constants that the rules engine 910 needs to perform its table mapping operations (e.g., the value 0, a dispatch port number for resubmits, etc.). The miscellaneous tables further include function tables that store functions that the rules engine 910 uses to calculate values to populate the output tables 920.

The rules engine 910 performs table mapping operations that specify one manner for converting input data to output data. Whenever one of the input tables is modified (referred to as an input table event), the rules engine performs a set of table mapping operations that may result in the modification of one or more data tuples in one or more output tables.

In some embodiments, the rules engine 910 includes an event processor (not shown), several query plans (not shown), and a table processor (not shown). Each query plan is a set of rules that specifies a set of join operations that are to be performed upon the occurrence of an input table event. The event processor of the rules engine 910 detects the occurrence of each such event. In some embodiments, the event processor registers for callbacks with the input tables for notification of changes to the records in the input tables 915, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 920.

Some embodiments use a variation of the Datalog database language to allow application developers to create the rules engine for the controller, and thereby to specify the manner by which the controller maps logical datapath sets to the controlled physical switching infrastructure. This variation of the Dartalog database language is referred to herein as nLog. Like Datalog, nLog provides a few declaratory rules and operators that allow a developer to specify different operations that are to be performed upon the occurrence of different events. In some embodiments, nLog provides a limited subset of the operators that are provided by Datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 915, the output tables 920 include tables with different types of data depending on the role of the controller 900. When the controller 900 functions as a logical controller, the output tables 915 include LFP data and UPCP data for the logical switching elements. When the controller 900 functions as a physical controller, the output tables 920 include CPCP data. Like the input tables, the output tables 920 may also include the middlebox configuration data. Furthermore, the output tables 920 may include a slice identifier when the controller 900 functions as a physical controller.

In some embodiments, the output tables 920 can be grouped into several different categories. For instance, in some embodiments, the output tables 920 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 925 to export the change to another controller or a MSE. An output table can be an RE input table, a RE output table, or both an RE input table and a RE output table.

The exporter 925 detects changes to the RE output tables of the output tables 920. In some embodiments, the exporter registers for callbacks with the RE output tables for notification of changes to the records of the RE output tables. In such embodiments, the exporter 925 detects an output table event when it receives notification from a RE output table that one of its records has changed.

In response to a detected output table event, the exporter 925 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 900 does not keep in the output tables 920 the data for logical datapath sets that the controller is not responsible for managing (i.e., for logical networks managed by other logical controllers). However, such data is translated by the translator 935 into a format that can be stored in the PTD 940 and is then stored in the PTD. The PTD 940 propagates this data to PTDs of one or more other controllers so that those other controllers that are responsible for managing the logical datapath sets can process the data.

In some embodiments, the controller also brings the data stored in the output tables 920 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 930 interfaces with a number of different sources of input data and uses the input data to modify or create the input tables 915. The importer 930 of some embodiments receives the input data from another controller. The importer 930 also interfaces with the PTD 940 so that data received through the PTD from other controller instances can be translated and used as input data to modify or create the input tables 915. Moreover, the importer 930 also detects changes with the RE input tables in the output tables 920.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
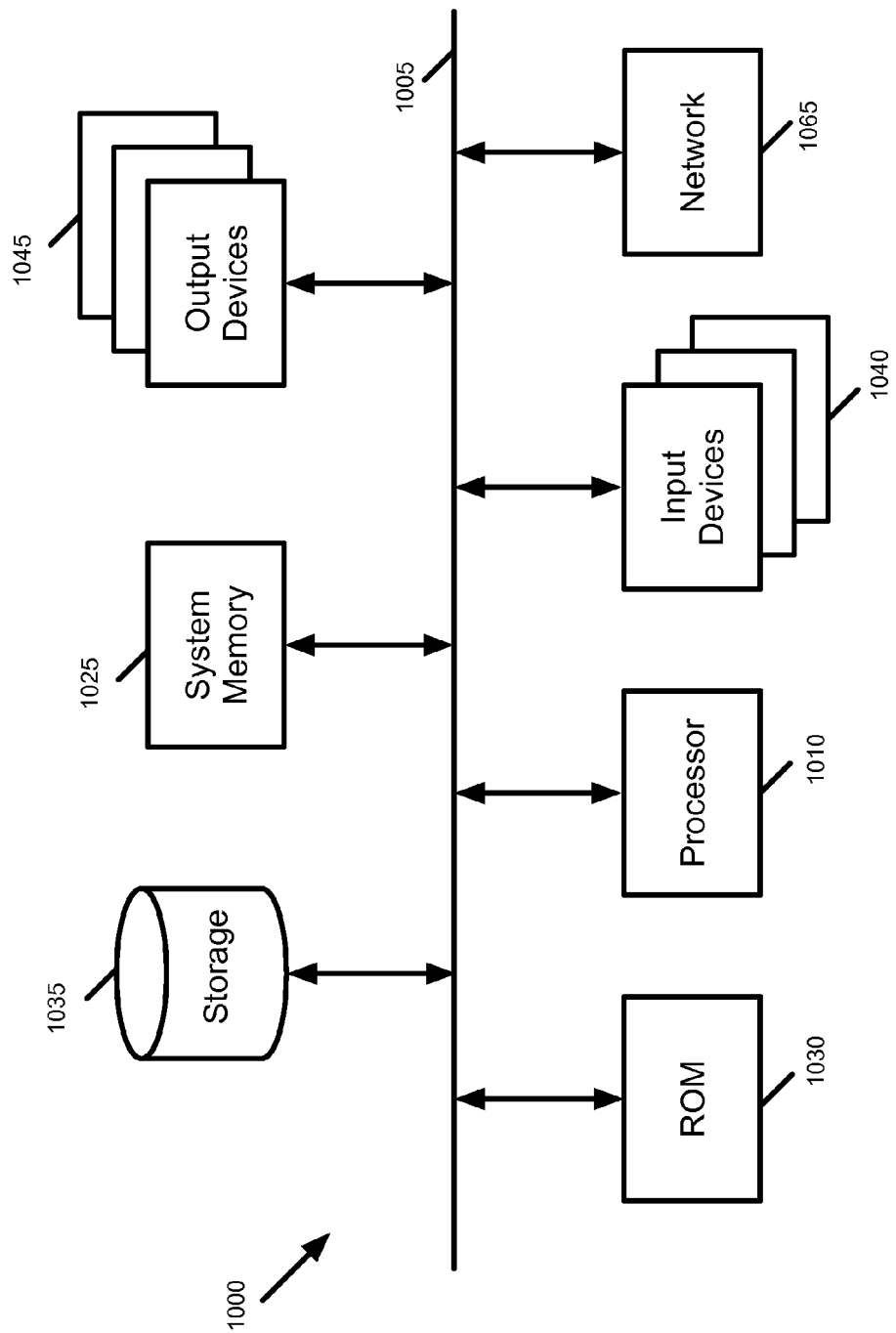
FIG. 10 conceptually illustrates an electronic system with which some embodiments of the invention are implemented.

FIG. 10 conceptually illustrates an electronica computer system 1000 with which some embodiments of the invention are implemented. The electronic system 1000 may be a computer, server, dedicated switch, phone, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, or ZIP® disk, and its corresponding disk drive) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory machine readable medium of a controller of a network control system for configuring a plurality of middlebox instances to implement a middlebox in a distributed manner in a plurality of hosts, the non-transitory machine readable medium storing sets of instructions for:
configuring, in a first host, a first middlebox instance to:
receive a notification from a migration module before a virtual machine (VM) running in the first host migrates to a second host; and
send middlebox state related to the VM to the migration module,
wherein the migration module migrates the middlebox state to the second host.

2. The non-transitory machine readable medium of claim 1, wherein the sets of instructions further comprise a set of instructions for:
configuring, in the second host, a second middlebox instance to:
receive the middlebox state related to the VM; and
resume a middlebox service based on the middlebox state.

3. The non-transitory machine readable medium of claim 1, wherein the migration module migrates the VM to the second host.

4. The non-transitory machine readable medium of claim 1, wherein the migration module is part of a hypervisor of the first host.

5. A non-transitory machine readable medium storing a distributed middlebox application for execution by at least one processing unit of a host machine, the host machine comprising a migration module that migrates a virtual machine (VM) to another host machine, the distributed middlebox application comprising sets of instructions for:
receiving a notification from the migration module before the migration module migrates the VM to the other host machine;
identifying middlebox state that relates to the VM; and
supplying the identified middlebox state to the migration module,
wherein the migration module subsequently migrates the middlebox state to the other host machine.

6. The non-transitory machine readable medium of claim 5, wherein the distributed middlebox application at least partially implements a logical middlebox that is part of a logical network.

7. The non-transitory machine readable medium of claim 6, wherein the logical network includes a set of logical forwarding elements that are implemented in a plurality of managed switching elements.

8. The non-transitory machine readable medium of claim 7, wherein a managed switching element is running in the hosted machine.

9. The non-transitory machine readable medium of claim 5, wherein the migration module is part of a hypervisor of the host machine.

10. A non-transitory machine readable medium of a first controller of a network control system for configuring a plurality of middlebox instances to implement a middlebox in a distributed manner in a plurality of hosts, the network control system comprising a plurality of controllers, the non-transitory machine readable medium storing sets of instructions for:
receiving configuration data for configuring, in a first host, a middlebox instance to migrate middlebox state of a virtual machine (VM) to a second host when the VM migrates from the first host to the second host;
identifying a set of other controllers in the network control system that manage the middlebox instance; and
directing the identified set of other controllers to send the configuration data to the middlebox instance.

11. The non-transitory machine readable medium of claim 10, wherein the configuration data includes a set of instructions for receiving a notification from a migration module of the first host.

12. The non-transitory machine readable medium of claim 11, wherein the configuration data include a set of instructions for identifying middlebox state that relates to the VM.

13. The non-transitory machine readable medium of claim 12, wherein the configuration data includes a set of instructions for supplying the identified middlebox state to the migration module.

14. The non-transitory machine readable medium of claim 12, wherein the network control system is for generating physical control plane data for managing first and second managed forwarding elements that implement forwarding operations associated with a first logical datapath set, wherein the sets of instructions further comprise a set of instructions for converting logical control plane data for the first logical datapath set to universal physical control plane data.

15. The non-transitory machine readable medium of claim 14, wherein the first controller is a master controller for the first logical datapath set, wherein each of the identified set of other controllers is a master controller for a set of managed forwarding elements that are hosted together with the middlebox instances.

16. A non-transitory machine readable medium of a controller of a network control system for configuring a plurality of middlebox instances to implement a middlebox in a distributed manner in a plurality of hosts, the non-transitory machine readable medium storing sets of instructions for:
configuring, in a first host, a first middlebox instance to:
share a first middlebox state with a second middlebox instance that is configured in a second host; and
send a second middlebox state to a migration module of the first host that subsequently migrates the second middlebox state,
wherein the first middlebox state and the second middlebox state relate to a virtual machine (VM) that is running in the first host.

17. The non-transitory machine readable medium of claim 16, wherein the migration module migrates the VM to the second host.

18. The non-transitory machine readable medium of claim 16, wherein the first middlebox state and the second middlebox state do not overlap.

* * * * *